US012347446B2

(12) United States Patent
Sehlstedt

(10) Patent No.: US 12,347,446 B2
(45) Date of Patent: *Jul. 1, 2025

(54) ESTIMATION OF BACKGROUND NOISE IN AUDIO SIGNALS

(71) Applicant: Telefonaktiebolaget LM Ericsson (publ), Stockholm (SE)

(72) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

This patent is subject to a terminal disclaimer.

(21) Appl. No.: 18/120,483

(22) Filed: Mar. 13, 2023

(65) Prior Publication Data

US 2023/0215447 A1 Jul. 6, 2023

Related U.S. Application Data

(63) Continuation of application No. 17/392,908, filed on Aug. 3, 2021, now Pat. No. 11,636,865, which is a (Continued)

(51) Int. Cl.
*G10L 19/02* (2013.01)
*G10L 19/012* (2013.01)
(Continued)

(52) U.S. Cl.
CPC ...... *G10L 19/0208* (2013.01); *G10L 21/0324* (2013.01); *G10L 21/0388* (2013.01); (Continued)

(58) Field of Classification Search
CPC ............. G10L 19/0208; G10L 21/0324; G10L 21/0388; G10L 25/78; G10L 19/012; (Continued)

(56) References Cited

U.S. PATENT DOCUMENTS 5,297,213 A 3/1994 Holden
5,321,793 A 6/1994 Drogo De Iacovo et al.
(Continued)

FOREIGN PATENT DOCUMENTS

CN 1168204 A 12/1997
CN 1484824 A 3/2004
(Continued)

OTHER PUBLICATIONS

International Search Report and Written Opinion of the International Searching Authority, Application No. PCT/SE2015/070770, Sep. 1, 2015.

(Continued)

*Primary Examiner* — Fariba Sirjani
(74) *Attorney, Agent, or Firm* — Sage Patent Group

(57) ABSTRACT

Background noise estimators and methods are disclosed for estimating background noise in an audio signal. Some methods include obtaining at least one parameter associated with an audio signal segment, such as a frame or part of a frame, based on a first linear prediction gain, calculated as a quotient between a residual signal from a 0th-order linear prediction and a residual signal from a 2nd-order linear prediction for the audio signal segment. A second linear prediction gain is calculated as a quotient between a residual signal from a 2nd-order linear prediction and a residual signal from a 16th-order linear prediction for the audio signal segment. Whether the audio signal segment comprises a pause is determined based at least on the obtained at least one parameter; and a background noise estimate is updated based on the audio signal segment when the audio signal segment comprises a pause.

16 Claims, 18 Drawing Sheets

Related U.S. Application Data continuation of application No. 16/408,848, filed on May 10, 2019, now Pat. No. 11,114,105, which is a continuation of application No. 15/818,848, filed on Nov. 21, 2017, now Pat. No. 10,347,265, which is a continuation of application No. 15/119,956, filed as application No. PCT/SE2015/050770 on Jul. 1, 2015, now Pat. No. 9,870,780.

(60) Provisional application No. 62/030,121, filed on Jul. 29, 2014.

(51) Int. Cl.
*G10L 21/0324* (2013.01)
*G10L 21/0388* (2013.01)
*G10L 25/03* (2013.01)
*G10L 25/78* (2013.01)

(52) U.S. Cl.
CPC ............ *G10L 25/78* (2013.01); *G10L 19/012* (2013.01); *G10L 25/03* (2013.01)

(58) Field of Classification Search
CPC ..... G10L 25/03; G10L 21/0216; G10L 25/12; G10L 19/04; G10L 19/02; G10L 704/266
See application file for complete search history.

(56) References Cited

U.S. PATENT DOCUMENTS

| | | | | |
|---|---|---|---|---|
| 5,483,594 | A | 1/1996 | Prado et al. | |
| 5,642,465 | A | 6/1997 | Scott et al. | |
| 5,659,622 | A * | 8/1997 | Ashley | G10L 21/0208 381/94.1 |
| 6,691,082 | B1 | 2/2004 | Aguilar et al. | |
| 6,691,085 | B1 * | 2/2004 | Rotola-Pukkila | G10L 21/0364 704/214 |
| 6,782,361 | B1 | 8/2004 | El-Maleh et al. | |
| 7,065,486 | B1 | 6/2006 | Thyssen | |
| 7,318,025 | B2 | 1/2008 | Fischer et al. | |
| 7,454,010 | B1 | 11/2008 | Ebenezer | |
| 8,244,523 | B1 | 8/2012 | Murphy | |
| 8,577,675 | B2 | 11/2013 | Jelinek | |
| 8,990,073 | B2 | 3/2015 | Malenovsky et al. | |
| 9,443,526 | B2 | 9/2016 | Toftgard | |
| 9,870,780 | B2 * | 1/2018 | Sehlstedt | G10L 25/78 |
| 10,347,265 | B2 * | 7/2019 | Sehlstedt | G10L 19/0208 |
| 11,114,104 | B2 * | 9/2021 | Trim | G06F 3/167 |
| 11,114,105 | B2 | 9/2021 | Sehlstedt | |
| 11,636,865 | B2 * | 4/2023 | Sehlstedt | G10L 25/78 704/226 |
| 2002/0052738 | A1 | 5/2002 | Paksoy et al. | |
| 2003/0078770 | A1 | 4/2003 | Fischer et al. | |
| 2003/0135367 | A1 | 7/2003 | Thyssen et al. | |
| 2005/0143978 | A1 | 6/2005 | Martin et al. | |
| 2005/0143989 | A1 | 6/2005 | Jelinek | |
| 2006/0265219 | A1 | 11/2006 | Honda | |
| 2007/0078645 | A1 | 4/2007 | Niemisto et al. | |
| 2008/0167870 | A1 | 7/2008 | Hetherington et al. | |
| 2010/0088092 | A1 * | 4/2010 | Bruhn | G10L 19/26 704/E21.002 |
| 2010/0174537 | A1 | 7/2010 | Vos et al. | |
| 2010/0188092 | A1 | 7/2010 | Sekizaki et al. | |
| 2011/0035213 | A1 | 2/2011 | Malenovsky et al. | |
| 2011/0119067 | A1 | 5/2011 | Beack et al. | |
| 2012/0089393 | A1 | 4/2012 | Tanaka | |
| 2015/0235648 | A1 | 8/2015 | Toftgard | |
| 2016/0078884 | A1 * | 3/2016 | Sehlstedt | G10L 15/20 704/233 |
| 2016/0155456 | A1 | 6/2016 | Wang | |
| 2016/0155457 | A1 | 6/2016 | Bruhn | |
| 2017/0069331 | A1 | 3/2017 | Sehlstedt | |
| 2018/0075854 | A1 * | 3/2018 | Bruhn | G10L 19/26 |
| 2018/0322895 | A1 * | 11/2018 | Gao | G10L 19/22 |
| 2019/0333529 | A1 * | 10/2019 | Fuchs | G10L 19/083 |
| 2023/0215477 | A1 * | 7/2023 | Jeong | G06N 3/08 365/189.011 |

FOREIGN PATENT DOCUMENTS

| | | | |
|---|---|---|---|
| CN | 101080766 | A | 11/2007 |
| CN | 102667927 | A | 9/2012 |
| CN | 103440871 | A | 12/2013 |
| JP | 2001-236085 | A | 8/2001 |
| JP | 2002-258897 | A | 9/2002 |
| JP | 2007-517249 | A | 6/2007 |
| JP | 2010-520513 | A | 6/2010 |
| JP | 2010-530989 | A | 9/2010 |
| JP | 2016-527564 | A | 9/2016 |
| JP | 2017-515138 | A | 6/2017 |
| KR | 20030034260 | A | 5/2003 |
| RU | 2 317 595 | C1 | 2/2008 |
| RU | 2417459 | C2 | 4/2011 |
| RU | 2 441 286 | C2 | 1/2012 |
| RU | 2 469 419 | C2 | 12/2012 |
| WO | WO 97/22116 | A1 | 6/1997 |
| WO | WO 97/22117 | A1 | 6/1997 |
| WO | WO 2011/049514 | A1 | 4/2011 |
| WO | WO 2011/049515 | A1 | 4/2011 |
| WO | WO 2012/110481 | A1 | 8/2012 |

OTHER PUBLICATIONS

3GPP, Technical Specification—"3rd Generation Partnership Project; Technical Specification Group Services and System Aspects; Mandatory speech CODEC speech processing functions; AMR speech CODEC; General description (Release 13)", 3GPP TS 26.071 V13.0.0 (Dec. 2015), 12 pp.

ITU-T—Telecommunication Standardization Sector of International Telecommunication Union, "G.718 : Frame error robust narrow-band and wideband embedded variable bit-rate coding of speech and audio from 8-32 kbit/s", downloaded Aug. 17, 2016 from https://www.itu.int/rec/T-REC-G.718/en.

Jelinek et al., "Noise Reduction Method for Wideband Speech Coding", *IEEE 2004 12th European Signal Processing*, Vienna, AT, Sep. 6, 2004, pp. 1959-1962.

Nemer et al., "Robust Voice Activity Detection Using Higher-Order Statistics in the LPC Residual Domain", *IEEE Transactions On Speech and Audio Processing*, vol. 9, No. 3, Mar. 2001, pp. 217-231.

Letter regarding Office Action for Japanese Patent Application No. 2016-552887 dated May 15, 2017 (3 pages).

Extended European Search Report issued Mar. 19, 2018 for European Patent Application No. 17202308.7, 6 pages.

Office Action issued Feb. 27, 2018 for Russian Patent Application No. 2017106163/08(010884), 5 pages.

Office Action for Chinese Patent Application No. 201580040591.8 dated Apr. 1, 2020, 14 pages; English Translation of Office Action for Chinese Patent Application No. 201580040591.8 dated Apr. 1, 2020, 4 pages.

Notice of Allowance for Japanese Patent Application No. 2019-184033 dated Oct. 19, 2020.

Decision to Grant including Search Report, with English translation, for Russian Patent Application No. 2020100879/28(001229) dated Oct. 13, 2021.

Substantive Examination Report for Philippines Patent Application No. 1/2017/500031 mailed Jan. 25, 2024, 5 pages.

Notice of Allowance for Chinese Patent Application No. 202110082923.6 mailed Jan. 1, 2025, 7 pages.

* cited by examiner

-PRIOR ART-

ESTIMATION OF BACKGROUND NOISE IN AUDIO SIGNALS

CROSS REFERENCE TO RELATED APPLICATIONS

This application is a continuation of U.S. patent application Ser. No. 17/392,908, filed Aug. 3, 2021, which is a continuation of U.S. patent application Ser. No. 16/408,848, filed May 10, 2019 (now U.S. Pat. No. 11,114,105), which is a continuation of U.S. patent application Ser. No. 15/818,848, filed Nov. 21, 2017 (now U.S. Pat. No. 10,347,265), which is a continuation of U.S. patent application Ser. No. 15/119,956, filed Aug. 18, 2016 (now U.S. Pat. No. 9,870,780), which itself claims the benefit as a 35 U.S.C. § 371 national stage application of PCT International Application No. PCT/SE2015/050770, filed Jul. 1, 2015, which itself claims the benefit of U.S. provisional Application No. 62/030,121, filed Jul. 29, 2014, the disclosure and content of each of which are incorporated by reference herein in their entireties. The above-referenced PCT International Application was published in the English language as International Publication No. WO 2016/018186 A1 on Feb. 4, 2016.

TECHNICAL FIELD

The embodiments of the present invention relate to audio signal processing, and in particular to estimation of background noise, e.g. for supporting a sound activity decision.

BACKGROUND

In communication systems utilizing discontinuous transmission (DTX) it is important to find a balance between efficiency and not reducing quality. In such systems an activity detector is used to indicate active signals, e.g. speech or music, which are to be actively coded, and segments with background signals which can be replaced with comfort noise generated at the receiver side. If the activity detector is too efficient in detecting non-activity, it will introduce clipping in the active signal, which is then perceived as subjective quality degradation when the clipped active segment is replaced with comfort noise. At the same time, the efficiency of the DTX is reduced if the activity detector is not efficient enough and classifies background noise segments as active and then actively encodes the background noise instead of entering a DTX mode with comfort noise. In most cases the clipping problem is considered worse.

FIG. 1 shows an overview block diagram of a generalized sound activity detector, SAD or voice activity detector, VAD, which takes an audio signal as input and produces an activity decision as output. The input signal is divided into data frames, i.e. audio signal segments of e.g. 5-30 ms, depending on the implementation, and one activity decision per frame is produced as output.

A primary decision, "prim", is made by the primary detector illustrated in FIG. 1. The primary decision is basically just a comparison of the features of a current frame with background features, which are estimated from previous input frames. A difference between the features of the current frame and the background features which is larger than a threshold causes an active primary decision. The hangover addition block is used to extend the primary decision based on past primary decisions to form the final decision, "flag". The reason for using hangover is mainly to reduce/remove the risk of mid and backend clipping of burst of activity. As indicated in the figure, an operation controller may adjust the threshold(s) for the primary detector and the length of the hangover addition according to the characteristics of the input signal. The background estimator block is used for estimating the background noise in the input signal. The background noise may also be referred to as "the background" or "the background feature" herein.

Estimation of the background feature can be done according to two basically different principles, either by using the primary decision, i.e. with decision or decision metric feedback, which is indicated by dash-dotted line in FIG. 1, or by using some other characteristics of the input signal, i.e. without decision feedback. It is also possible to use combinations of the two strategies.

An example of a codec using decision feedback for background estimation is AMR-NB (Adaptive Multi-Rate Narrowband) and examples of codecs where decision feedback is not used are EVRC (Enhanced Variable Rate CODEC) and G.718. There are a number of different signal features or characteristics that can be used, but one common feature utilized in VADs is the frequency characteristics of the input signal. A commonly used type of frequency characteristics is the sub-band frame energy, due to its low complexity and reliable operation in low SNR. It is therefore assumed that the input signal is split into different frequency sub-bands and the background level is estimated for each of the sub-bands. In this way, one of the background noise features is the vector with the energy values for each sub-band. These are values that characterize the background noise in the input signal in the frequency domain.

To achieve tracking of the background noise, the actual background noise estimate update can be made in at least three different ways. One way is to use an Auto Regressive, AR,-process per frequency bin to handle the update. Examples of such codecs are AMR-NB and G.718. Basically, for this type of update, the step size of the update is proportional to the observed difference between current input and the current background estimate. Another way is to use multiplicative scaling of a current estimate with the restriction that the estimate never can be bigger than the current input or smaller than a minimum value. This means that the estimate is increased each frame until it is higher than the current input. In that situation the current input is used as estimate. EVRC is an example of a codec using this technique for updating the background estimate for the VAD function. Note that EVRC uses different background estimates for VAD and noise suppression. It should be noted that a VAD may be used in other contexts than DTX. For example, in variable rate codecs, such as EVRC, the VAD may be used as part of a rate determining function.

A third way is to use a so-called minimum technique where the estimate is the minimum value during a sliding time window of prior frames. This basically gives a minimum estimate which is scaled, using a compensation factor, to get and approximate average estimate for stationary noise.

In high SNR cases, where the signal level of the active signal is much higher than the background signal, it may be quite easy to make a decision of whether an input audio signal is active or non-active. However, to separate active and non-active signals in low SNR cases, and in particular when the background is non-stationary or even similar to the active signal in its characteristics, is very difficult.

The performance of the VAD depends on the ability of the background noise estimator to track the characteristics of the background—in particular when it comes to non-stationary backgrounds. With better tracking it is possible to make the VAD more efficient without increasing the risk of speech clipping.

While correlation is an important feature that is used to detect speech, mainly the voiced part of the speech, there are also noise signals that show high correlation. In these cases the noise with correlation will prevent update of background noise estimates. The result is a high activity as both speech and background noise is coded as active content. While for high SNRs (approximately >20 dB) it would be possible to reduce the problem using energy based pause detection, this is not reliable for the SNR range 20 dB down to 10 dB or possibly 5 dB. It is in this range that the solution described herein makes a difference.

SUMMARY

It would be desirable to achieve improved estimation of background noise in audio signals. "Improved" may here imply making more correct decision in regard of whether an audio signal comprises active speech or music or not, and thus more often estimating, e.g. updating a previous estimate, the background noise in audio signal segments actually being free from active content, such as speech and/or music. Herein, an improved method for generating a background noise estimate is provided, which may enable e.g. a sound activity detector to make more adequate decisions.

For background noise estimation in audio signals, it is important to be able to find reliable features to identify the characteristics of a background noise signal also when an input signal comprises an unknown mixture of active and background signals, where the active signals can comprise speech and/or music.

The inventor has realized that features related to residual energies for different linear prediction model orders may be utilized for detecting pauses in audio signals. These residual energies may be extracted e.g. from a linear prediction analysis, which is common in speech codecs. The features may be filtered and combined to make a set of features or parameters that can be used to detect background noise, which makes the solution suitable for use in noise estimation. The solution described herein is particularly efficient for the conditions when an SNR is in the range of 10 to 20 dB.

Another feature provided herein is a measure of spectral closeness to background, which may be made e.g. by using the frequency domain sub-band energies which are used e.g. in a sub-band SAD. The spectral closeness measure may also be used for making a decision of whether an audio signal comprises a pause or not.

According to a first aspect, a method for background noise estimation is provided. The method comprises obtaining at least one parameter associated with an audio signal segment, such as a frame or part of a frame, based on a first linear prediction gain, calculated as a quotient between a residual signal from a 0th-order linear prediction and a residual signal from a 2nd-order linear prediction for the audio signal segment; and, a second linear prediction gain calculated as a quotient between a residual signal from a 2nd-order linear prediction and a residual signal from a 16th-order linear prediction for the audio signal segment. The method further comprises determining whether the audio signal segment comprises a pause based at least on the obtained at least one parameter; and, updating a background noise estimate based on the audio signal segment when the audio signal segment comprises a pause.

According to a second aspect, a background noise estimator is provided. The background noise estimator is configured to obtain at least one parameter associated with an audio signal segment based on a first linear prediction gain, calculated as a quotient between a residual signal from a 0th-order linear prediction and a residual signal from a 2nd-order linear prediction for the audio signal segment; and, a second linear prediction gain calculated as a quotient between a residual signal from a 2nd-order linear prediction and a residual signal from a 16th-order linear prediction for the audio signal segment. The background noise estimator is further configured to determine whether the audio signal segment comprises a pause based at least on the obtained at least one parameter; and, to update a background noise estimate based on the audio signal segment when the audio signal segment comprises a pause.

According to a third aspect, a SAD is provided, which comprises a background noise estimator according to the second aspect.

According to a fourth aspect, a codec is provided, which comprises a background noise estimator according to the second aspect.

According to a fifth aspect, a communication device is provided, which comprises a background noise estimator according to the second aspect.

According to a sixth aspect, a network node is provided, which comprises a background noise estimator according to the second aspect.

According to a seventh aspect, a computer program is provided, comprising instructions which, when executed on at least one processor, cause the at least one processor to carry out the method according to the first aspect.

According to an eighth aspect, a carrier is provided, which contains a computer program according to the seventh aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
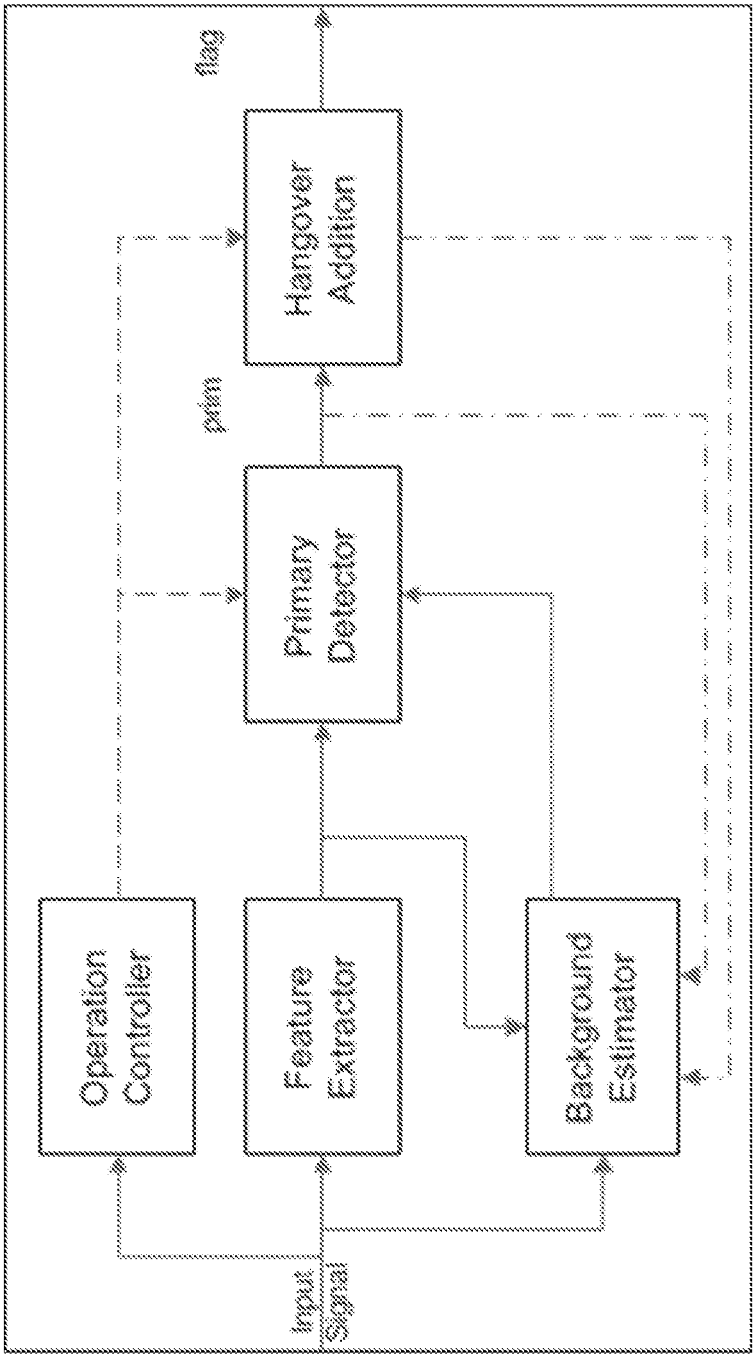
FIG. 1 is a block diagram illustrating an activity detector and hangover determination logic.

The solution disclosed herein relates to estimation of background noise in audio signals. In the generalized activity detector illustrated in FIG. 1, the function of estimating background noise is performed by the block denoted "background estimator". Some embodiments of the solution described herein may be seen in relation to solutions previously disclosed in WO2011/049514, WO2011/049515, which are incorporated herein by reference, and also in Annex A (Appendix A). The solution disclosed herein will be compared to implementations of these previously disclosed solutions. Even though the solutions disclosed in WO2011/049514, WO2011/049515 and Annex A are good solutions, the solution presented herein still has advantages in relation to these solutions. For example, the solution presented herein is even more adequate in its tracking of background noise.

The performance of a VAD depends on the ability of the background noise estimator to track the characteristics of the background—in particular when it comes to non-stationary backgrounds. With better tracking it is possible to make the VAD more efficient without increasing the risk of speech clipping.

One problem with current noise estimation methods is that to achieve good tracking of the background noise in low SNR, a reliable pause detector is needed. For speech only input, it is possible to utilize the syllabic rate or the fact that a person cannot talk all the time to find pauses in the speech. Such solutions could involve that after a sufficient time of not making background updates, the requirements for pause detection are "relaxed", such that it is more probable to detect a pause in the speech. This allows for responding to abrupt changes in the noise characteristics or level. Some examples of such noise recovery logics are: 1) As speech utterances contain segments with high correlation, it is usually safe to assume that there is a pause in the speech after a sufficient number of frames without correlation. 2) When the Signal to Noise Ratio, SNR>0, the speech energy is higher than the background noise, so if the frame energy is close to the minimum energy over a longer time, e.g. 1-5 seconds, it is also safe to assume that one is in a speech pause. While the previous techniques work well with speech only input they are not sufficient when music is considered an active input. In music there can be long segments with low correlation that still are music. Further, the dynamics of the energy in music can also trigger false pause detection, which may result in unwanted, erroneous updates of the background noise estimate.

Ideally, an inverse function of an activity detector, or what would be called a "pause occurrence detector", would be needed for controlling the noise estimation. This would ensure that the update of the background noise characteristics is done only when there is no active signal in the current frame. However, as indicated above, it is not an easy task to determine whether an audio signal segment comprises an active signal or not.

Traditionally, when the active signal was known to be a speech signal, the activity detector was called Voice Activity Detector (VAD). The term VAD for activity detectors is often used also when the input signal may comprise music. However, in modern codecs, it is also common to refer to the activity detector as a Sound Activity Detector (SAD) when also music is to be detected as an active signal.

The background estimator illustrated in FIG. 1 utilizes feedback from the primary detector and/or the hangover block to localize inactive audio signal segments. When developing the technology described herein, it has been a desire to remove, or at least reduce the dependency on such feedback. For the herein disclosed background estimation it has therefore been identified by the inventor as important to be able to find reliable features to identify the background signals characteristics when only an input signal with an unknown mixture of active and background signal is available. The inventor has further realized that it cannot be assumed that the input signal starts with a noise segment, or even that the input signal is speech mixed with noise, as it may be that the active signal is music.

One aspect is that even though the current frame may have the same energy level as the current noise estimate, the frequency characteristics may be very different, which makes it undesirable to perform an update of the noise estimate using the current frame. The introduced closeness feature relative background noise update can be used to prevent updates in these cases.

Further, during initialization it is desirable to allow the noise estimation to start as soon as possible while avoiding wrong decisions as this potentially could result in clipping from the SAD if the background noise update is made using active content. Using an initialization specific version of the closeness feature during initialization can at least partly solve this problem.

The solution described herein relates to a method for background noise estimation, in particular to a method for detecting pauses in an audio signal which performs well in difficult SNR situations. The solution will be described below with reference to FIGS. 2-5.

In the field of speech coding, it is common to use so-called linear prediction to analyze the spectral shape of an input signal. The analysis is typically made two times per frame, and for improved temporal accuracy the results are then interpolated such that there is a filter generated for each 5 ms block of the input signal.

Linear prediction is a mathematical operation, where future values of a discrete-time signal are estimated as a linear function of previous samples. In digital signal processing, linear prediction is often called linear predictive coding (LPC) and can thus be viewed as a subset of filter theory. In linear prediction in a speech coder, a linear prediction filter $A(z)$ is applied to an input speech signal. $A(z)$ is an all zero filter that when applied to the input signal removes the redundancy that can be modeled using the filter $A(z)$ from the input signal. Therefore the output signal from the filter has lower energy than the input signal when the filter is successful in modelling some aspect or aspects of the input signal. This output signal is denoted "the residual", "the residual energy" or "the residual signal". Such linear prediction filters, alternatively denoted residual filters, may be of different model order having different number of filter coefficients. For example, in order to properly model speech, a linear prediction filter of model order 16 may be required. Thus, in a speech coder, a linear prediction filter $A(z)$ of model order 16 may be used.

The inventor has realized that features related to linear prediction may be used for detecting pauses in audio signals in an SNR range of 20 dB down to 10 dB or possibly 5 dB. According to embodiments of the solution described herein, a relation between residual energies for different model orders for an audio signal is utilized for detecting pauses in the audio signal. The relation used is the quotient between the residual energy of a lower model order and a higher model order. The quotient between residual energies may be referred to as the "linear prediction gain", since it is an indicator of how much of the signal energy that the linear prediction filter has been able to model, or remove, between one model order and another model order.

The residual energy will depend on the model order M of the linear prediction filter A(z). A common way of calculating the filter coefficients for a linear prediction filter is the Levinson-Durbin algorithm. This algorithm is recursive and will in the process of creating a prediction filter A(z) of order M also, as a "by-product", produce the residual energies of the lower model orders. This fact may be utilized according to embodiments of the invention.

Figure 2:
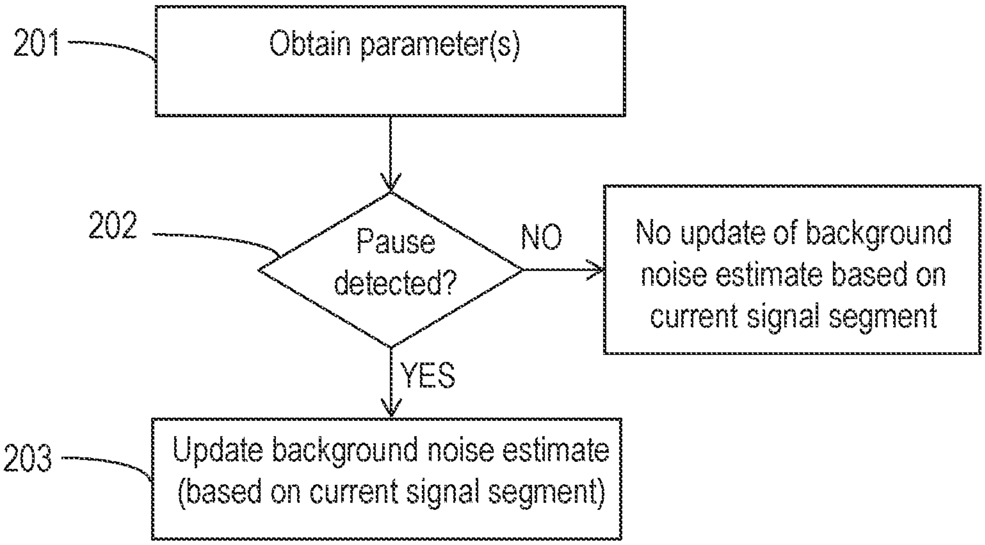
FIG. 2 is a flow chart illustrating a method for estimation of background noise, according to an exemplifying embodiment.

FIG. 2 shows an exemplifying general method for estimation of background noise in an audio signal. The method may be performed by a background noise estimator. The method comprises obtaining 201 at least one parameter associated with an audio signal segment, such as a frame or part of a frame, based on a first linear prediction gain, calculated as a quotient between a residual signal from a 0th-order linear prediction and a residual signal from a 2nd-order linear prediction for the audio signal segment; and, a second linear prediction gain calculated as a quotient between a residual signal from a 2nd-order linear prediction and a residual signal from a 16th-order linear prediction for the audio signal segment.

The method further comprises determining 202 whether the audio signal segment comprises a pause, i.e. is free from active content such as speech and music, based at least on the obtained at least one parameter; and, updating 203 a background noise estimate based on the audio signal segment when the audio signal segment comprises a pause. That is, the method comprises updating of a background noise estimate when a pause is detected in the audio signal segment based at least on the obtained at least one parameter.

The linear prediction gains could be described as a first linear prediction gain related to going from 0th-order to 2nd-order linear prediction for the audio signal segment; and a second linear prediction gain related to going from 2nd-order to 16th-order linear prediction for the audio signal segment. Further, the obtaining of the at least one parameter could alternatively be described as determining, calculating, deriving or creating. The residual energies related to linear predictions of model order 0, 2 and 16 may be obtained, received or retrieved from, i.e. somehow provided by, a part of the encoder where linear prediction is performed as part of a regular encoding process. Thereby, the computational complexity of the solution described herein may be reduced, as compared to when the residual energies need to be derived especially for the estimation of background noise.

The at least one parameter obtained based on the linear prediction features may provide a level independent analysis of the input signal that improves the decision for whether to perform a background noise update or not. The solution is particularly useful in the SNR range 10 to 20 dB, where energy based SADs have limited performance due to the normal dynamic range of speech signals.

Herein, among others, the variables E(0), . . . , E(m), . . . , E(M) represent the residual energies for model orders 0 to M of the M+1 filters $A_m(z)$. Note that E(0) is just the input energy. An audio signal analysis according to the solution described herein provides several new features or parameters by analyzing the linear prediction gain calculated as a quotient between a residual signal from a 0th-order linear prediction and a residual signal from a 2nd-order linear prediction, and the linear prediction gain calculated as a quotient between a residual signal from a 2nd-order linear prediction and a residual signal from a 16th-order linear prediction. That is, the linear prediction gain for going from 0th-order to 2nd-order linear prediction is the same thing as the "residual energy" E(0) (for a 0th model order) divided by the residual energy E(2) (for a 2nd model order). Correspondingly, the linear prediction gain for going from 2nd-order linear prediction to the 16th order linear prediction is the same thing as the residual energy E(2) (for a 2nd model order) divided by the residual energy E(16) (for a 16th model order). Examples of parameters and the determining of parameters based on the prediction gains will be described in more detail further below. The at least one parameter obtained according to the general embodiment described above may form a part of a decision criterion used for evaluating whether to update the background noise estimate or not.

In order to improve a long-term stability of the at least one parameter or feature, a limited version of the predictions gain can be calculated. That is, the obtaining of the at least one parameter may comprise limiting the linear prediction gains, related to going from 0th-order to 2nd-order and from 2nd-order to 16th-order linear prediction, to take on values in a predefined interval. For example, the linear prediction gains may be limited to take on values between 0 and 8, as illustrated e.g. in Eq.1 and Eq.6 below.

The obtaining of the at least one parameter may further comprise creating at least one long term estimate of each of the first and second linear prediction gain, e.g. by means of low pass filtering. Such at least one long term estimate would then be further based on corresponding linear prediction gains associated with at least one preceding audio signal segment. More than one long term estimate could be created, where e.g. a first and a second long term estimate related to a linear prediction gain react differently on changes in the audio signal. For example a first long term estimate may react faster on changes than a second long term estimate. Such a first long term estimate may alternatively be denoted a short term estimate.

The obtaining of the at least one parameter may further comprise determining a difference, such as the absolute difference Gd_0_2 (Eq.3) described below, between one of the linear prediction gains associated with the audio signal segment, and a long term estimate of said linear prediction gain. Alternatively or in addition, a difference between two long term estimates could be determined, such as in Eq.9 below. The term determining could alternatively be exchanged for calculating, creating or deriving.

The obtaining of the at least one parameter may as indicated above comprise low pass filtering of the linear prediction gains, thus deriving long term estimates, of which some may alternatively be denoted short term estimates, depending on how many segments that are taken into consideration in the estimate The filter coefficients of at least one low pass filter may depend on a relation between a linear prediction gain related, e.g. only, to the current audio signal segment and an average, denoted e.g. long term average, or long term estimate, of a corresponding prediction gain obtained based on a plurality of preceding audio signal segments. This may be performed to create, e.g. further, long term estimates of the prediction gains. The low pass filtering may be performed in two or more steps, where each step may result in a parameter, or estimate, that is used for making a decision in regard of the presence of a pause in the audio signal segment. For example, different long term estimates (such as G1_0_2 (Eq.2) and Gad_0_2 (Eq.4), and/or, G1_2_16 (Eq.7), G2_2_16 (Eq.8) and Gad_2_16 (Eq.10) described below) which reflect changes in the audio signal in different ways, may be analyzed or compared in order to detect a pause in a current audio signal segment.

The determining 202 of whether the audio signal segment comprises a pause or not may further be based on a spectral closeness measure associated with the audio signal segment. The spectral closeness measure will indicate how close the "per frequency band" energy level of the currently processed audio signal segment is to the "per frequency band" energy level of the current background noise estimate, e.g. an initial value or an estimate which is the result of a previous update made before the analysis of the current audio signal segment. An example of determining or deriving of a spectral closeness measure is given below in equations Eq.12 and Eq.13. The spectral closeness measure can be used to prevent noise updates based on low energy frames with a large difference in frequency characteristics, as compared to the current background estimate. For example, the average energy over the frequency bands could be equally low for the current signal segment and the current background noise estimate, but the spectral closeness measure would reveal if the energy is differently distributed over the frequency bands. Such a difference in energy distribution could suggest that the current signal segment, e.g. frame, may be low level active content and an update of the background noise estimate based on the frame could e.g. prevent detection of future frames with similar content. As the sub-band SNR is most sensitive to increases of energy using even low level active content can result in a large update of the background estimate if that particular frequency range is non-existent in the background noise, such as the high frequency part of speech compared to low frequency car noise. After such an update it will be more difficult to detect the speech.

Figure 5:
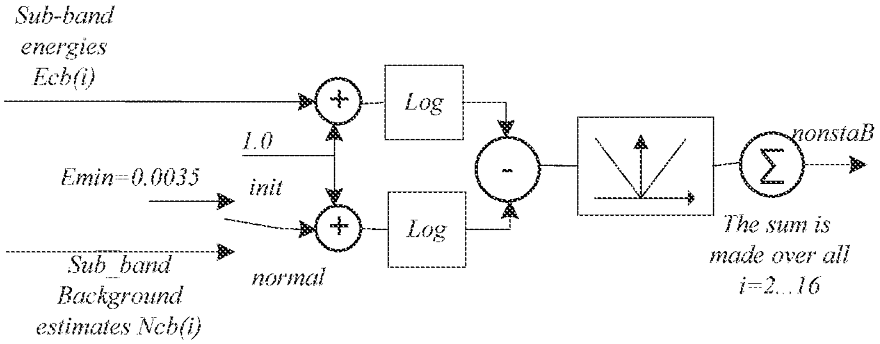
FIG. 5 is a block diagram illustrating calculation of features related to a spectral closeness measure according to an exemplifying embodiment.

As already suggested above, the spectral closeness measure may be derived, obtained or calculated based on energies for a set of frequency bands, alternatively denoted sub-bands, of the currently analyzed audio signal segment and current background noise estimates corresponding to the set of frequency bands. This will also be exemplified and described in more detail further below, and is illustrated in FIG. 5.

As indicated above, the spectral closeness measure may be derived obtained or calculated by comparing a current per frequency band energy level of the currently processed audio signal segment with a per frequency band energy level of a current background noise estimate. However, to start with, i.e. during a first period or a first number of frames in the beginning of analyzing an audio signal, there may be no reliable background noise estimate, e.g. since no reliable update of a background noise estimate will have been performed yet. Therefore, an initialization period may be applied for determining the spectral closeness value. During such an initialization period, the per frequency band energy levels of the current audio signal segment will instead be compared with an initial background estimate, which may be e.g. a configurable constant value. In the examples further below, this initial background noise estimate is set to the exemplifying value $E_{min}$=0,0035. After the initialization period the procedure may switch to normal operation, and compare the current per frequency band energy level of the currently processed audio signal segment with a per frequency band energy level of a current background noise estimate. The length of the initialization period may be configured e.g. based on simulations or tests indicating the time it takes before an, e.g. reliable and/or satisfying, background noise estimate is provided. An example used below, the comparison with an initial background noise estimate (instead of with a "real" estimate derived based on the current audio signal) is performed during the first 150 frames.

The at least one parameter may be the parameter exemplified in code further below, denoted NEW_POS_BG, and/or one or more of the plurality of parameters described further below, leading to the forming of a decision criterion or a component in a decision criterion for pause detection. In other words, the at least one parameter, or feature, obtained 201 based on the linear prediction gains may be one or more of the parameters described below, may comprise one or more of the parameters described below and/or be based on one or more of the parameters described below.

Features or Parameters Related to the Residual Energies E(0) and E(2)

Figure 3:
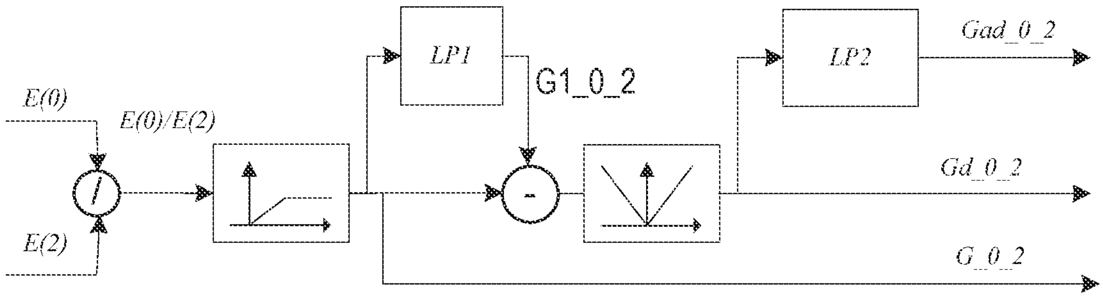
FIG. 3 is a block diagram illustrating calculation of features related to the residual energies for linear prediction of order 0 and 2 according to an exemplifying embodiment.

FIG. 3 shows an overview block diagram of the deriving of features or parameters related to E(0) and E(2), according to an exemplifying embodiment. As can be seen in FIG. 3, the prediction gain is first calculated as E(0)/E(2). A limited version of the predictions gain is calculated as $$G\_0\_2=\max(0,\min(8,E(0)/E(2))) \qquad \text{(Eq 1)}$$

where E(0) represents the energy of the input signal and E(2) is the residual energy after a 2nd order linear prediction. The expression in equation 1 limits the prediction gain to an interval between 0 and 8. The prediction gain should for normal cases be larger than zero, but anomalies may occur e.g. for values close to zero, and therefore a "larger than zero" limitation (0<) may be useful. The reason for limiting the prediction gain to a maximum of 8 is that, for the purpose of the solution described herein, it is sufficient to know that the prediction gain is about 8 or larger than 8, which indicates a significant linear prediction gain. It should be noted that when there is no difference between the residual energy between two different model orders, the linear prediction gain will be 1, which indicates that the filter of a higher model order is not more successful in modelling the audio signal than the filter of a lower model order. Further, if the prediction gain G_0_2 would take on too large values in the following expressions it may risk the stability of the derived parameters. It should be noted that 8 is just an example value, which has been selected for a specific embodiment. The parameter G_0_2 could alternatively be denoted e.g. epsP_0_2, or $g_{LP\_0\_2}$.

The limited prediction gain is then filtered in two steps to create long term estimates of this gain. The first low pass filtering and thus the deriving of a first long term feature or parameter is made as:

$$G1\_0\_2=0.85G1\_0\_2+0.15G\_0\_2 \qquad \text{(Eq. 2)}$$

Where the second "G1_0_2" in the expression should be read as the value from a preceding audio signal segment. This parameter will typically be either 0 or 8, depending on the type of background noise in the input once there is a segment of background-only input. The parameter G1_0_2 could alternatively be denoted e.g. epsP_0_2_lp or $\bar{g}_{LP\_0\_2}$. Another feature or parameter may then be created or calculated using the difference between the first long term feature G1_0_2 and the frame by frame limited prediction gain G_0_2, according to:

$$Gd\_0\_2=\text{abs}(G1\_0\_2-G\_0\_2) \qquad \text{(Eq. 3)}$$

Figure 4:
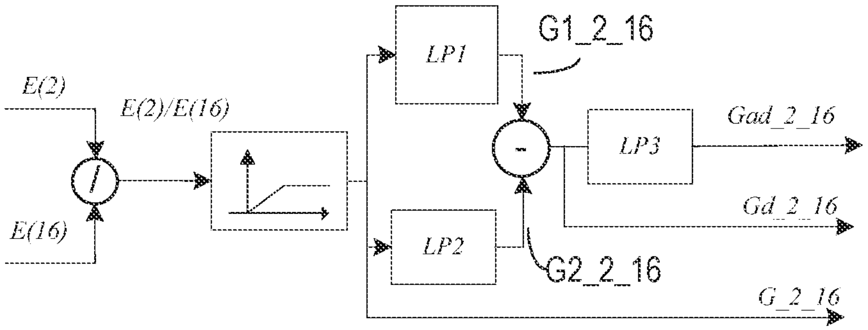
FIG. 4 is a block diagram illustrating calculation of features related to the residual energies for linear prediction of order 2 and 16 according to an exemplifying embodiment.

This will give an indication of the current frame's prediction gain as compared to the long term estimate of the prediction gain. The parameter Gd_0_2 could alternatively be denoted e.g. epsP_0_2_ad or $g_{ad\_0\_2}$. In FIG. 4, this difference is used to create a second long term estimate or feature Gad_0_2. This is done using a filter applying different filter coefficients depending on if the long term difference is higher or lower than the currently estimated average difference according to:

$$Gad\_0\_2=(1\text{-}a)Gad\_0\_2+a\ Gd\_0\_2 \quad \text{(Eq. 4)}$$

where, if Gd_0_2<Gad_0_2 then a=0.1 else a=0.2

Where the second "Gad_0_2" in the expression should be read as the value from a preceding audio signal segment.

The parameter Gad_0_2 could alternatively be denoted e.g. Glp_0_2, epsP_0_2_ad_lp or $\bar{g}_{ad\_0\_2}$ In order to prevent the filtering from masking occasional high frame differences another parameter may be derived, which is not shown in the figure. That is, the second long term feature Gad_0_2 may be combined with the frame difference in order to prevent such masking. This parameter may be derived by taking the maximum of the frame version Gd_0_2 and the long term version Gad_0_2 of the prediction gain feature, as:

$$G\max\_0\_2=\max(Gad\_0\_2,Gd\_0\_2) \quad \text{(Eq. 5)}$$

The parameter Gmax_0_2 could alternatively be denoted e.g. epsP_0_2_ad_lp_max or $g_{max\_0\_2}$.

Features or Parameters Related to the Residual Energies E(2) and E(16)

FIG. 4 shows an overview block diagram of the deriving of features or parameters related to E(2) and E(16), according to an exemplifying embodiment. As can be seen in FIG. 4, the prediction gain is first calculated as E(2)/E(16). The features or parameters created using the difference or relation between the $2^{nd}$ order residual energy and the 16th order residual energy is derived slightly differently than the ones described above related to the relation between the 0th and 2nd order residual energies.

Here, as well, a limited prediction gain is calculated as $$G\_2\_16=\max(0,\min(8,E(2)/E(16))) \quad \text{(Eq. 6)}$$

where E(2) represents the residual energy after a 2nd order linear prediction and E(16) represents the residual energy after a 16th order linear prediction. The parameter G_2_16 could alternatively be denoted e.g. epsP_2_16 or $g_{LP\_2\_16}$. This limited prediction gain is then used for creating two long term estimates of this gain: one where the filter coefficient differs if the long term estimate is to be increased or not as shown in:

$$G1\_2\_16=(1\text{-}a)G1\_2\_16+a\ G\_2\_16 \quad \text{(Eq. 7)}$$

where if G_2_16>G1_2_16 then a=0.2 else a=0.03

The parameter G1_2_16 could alternatively be denoted e.g. epsP_2_16_lp or $\bar{g}_{LP\_2\_16}$.

The second long term estimate uses a constant filter coefficient as according to:

$$G2\_2\_16=(1\text{-}b)G2\_2\_16+b\ G\_2\_16,\ \text{where } b=0.02 \quad \text{(Eq. 8)}$$

The parameter G2_2_16 could alternatively be denoted e.g. epsP_2_16_lp2 or $\bar{g}_{LP2\_0\_2}$.

For most types of background signals, both G1_2_16 and G2_2_16 will be close to 0, but they will have different responses to content where the 16th order linear prediction is needed, which is typically for speech and other active content. The first long term estimate, G1_2_16, will usually be higher than the second long term estimate G2_2_16. This difference between the long term features is measured according to:

$$Gd\_2\_16=G1\_2\_16-G2\_2\_16 \quad \text{(Eq. 9)}$$

The parameter Gd_2_16 could alternatively be denoted epsP_2_16_dlp or $g_{ad\_2\_16}$.

Gd_2_16 may then be used as an input to a filter which creates a third long term feature according to:

$$Gad\_2\_16=(1\text{-}c)Gad\_2\_16+cGd\_2\_16 \quad \text{(Eq. 10)}$$

where if Gd_2_16<Gad_2_16 then c=0.02 else c=0.05

This filter applies different filter coefficients depending on if the third long term signal is to be increased or not. The parameter Gad_2_16 may alternatively be denoted e.g. epsP_2_16_dlp_lp2 or $\bar{g}_{ad\_2\_16}$. Also here, the long term signal Gad_2_16 may be combined with the filter input signal Gd_2_16 to prevent the filtering from masking occasional high inputs for the current frame. The final parameter is then the maximum of the frame or segment and the long term version of the feature $$G\max\_2\_16=\max(Gad\_2\_16,Gd\_2\_16) \quad \text{(Eq. 11)}$$

The parameter Gmax_2_16 could alternatively be denoted e.g. epsP_2_16_dlp_max or $g_{max\_0\_2}$ Spectral Closeness/Difference Measure A spectral closeness feature uses the frequency analysis of the current input frame or segment where sub-band energy is calculated and compared to the sub-band background estimate. A spectral closeness parameter or feature may be used in combination with a parameter related to the linear prediction gains described above e.g. to make sure that the current segment or frame is relatively close to, or at least not too far from, a previous background estimate.

FIG. 5 shows a block diagram of the calculation of a spectral closeness or difference measure. During the initialization period, e.g. the 150 first frames, the comparison is made with a constant corresponding to the initial background estimate. After the initialization it goes to normal operation and compares with the background estimate. Note that while the spectral analysis produces sub-band energies for 20 sub-bands, the calculation of nonstaB here only uses sub-bands i=2, . . . 16, since it is mainly in these bands that speech energy is located. Here nonstaB reflects the non-stationarity.

So, during initialization, nonstaB is calculated using an Emin, which here is set to Emin=0.0035 as:

$$\text{nonsta}B=\text{sum}(\text{abs}(\log(Ecb(i)+1)-\log(E\min+1))) \quad \text{(Eq. 12)}$$

where sum is made over i=2 . . . 16.

This is done to reduce the effect of decision errors in the background noise estimation during initialization. After the initialization period the calculation is made using the current background noise estimate of the respective sub-band, according to:

$$\text{nonsta}B=\text{sum}(\text{abs}(\log(Ecb(i)+1)-\log(Ncb(i)+1))) \quad \text{(Eq. 13)}$$

where sum is made over i=2 . . . 16

The addition of the constant 1 to each sub-band energy before the logarithm reduces the sensitivity for the spectral difference for low energy frames. The parameter nonstaB could alternatively be denoted e.g. non_staB or $\text{nonstat}_B$.

Figure 6:
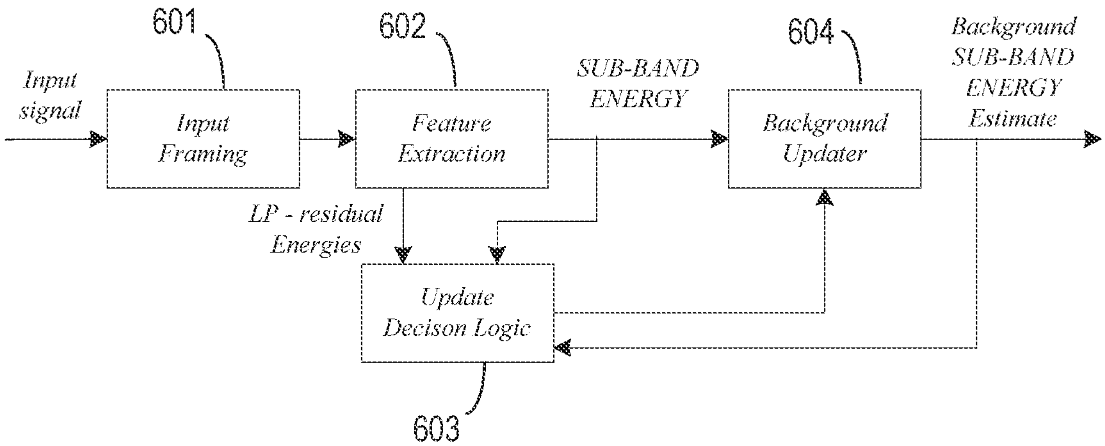
FIG. 6 is a block diagram illustrating a sub-band energy background estimator.

A block diagram illustrating an exemplifying embodiment of a background estimator is shown in FIG. 6. The embodiment in FIG. 6 comprises a block for Input Framing 601, which divides the input audio signal into frames or segments of suitable length, e.g. 5-30 ms. The embodiment further comprises a block for Feature Extraction 602 that calculates the features, also denoted parameters herein, for each frame or segment of the input signal. The embodiment further comprises a block for Update Decision Logic 603, for determining whether or not a background estimate may be updated based on the signal in the current frame, i.e. whether the signal segment is free from active content such as speech and music. The embodiment further comprises a Background Updater 604, for updating the background noise estimate when the update decision logic indicates that it is adequate to do so. In the illustrated embodiment, a background noise estimate may be derived per sub-band, i.e. for a number of frequency bands.

The solution described herein may be used to improve a previous solution for background noise estimation, described in Annex A herein, and also in the document WO2011/049514. Below, the solution described herein will be described in the context of this previously described solution. Code examples from a code implementation of an embodiment of a background noise estimator will be given.

Below, actual implementation details are described for an embodiment of the invention in a G.718 based encoder. This implementation uses many of the energy features described in the solution in Annex A and WO2011/049514 incorporated herein by reference. For further details than presented below, we refer to Annex A and WO2011/049514.

The following energy features are defined in WO2011/049514:

```
Etot;
Etot_l_lp;
Etot_v_h;
totalNoise;
sign_dyn_lp;
```

The following correlation features are defined in WO2011/049514:

```
aEn;
harm_cor_cnt
act_pred
cor_est
```

The following features were defined in the solution given in Annex A:

```
Etot_v_h;
lt_cor_est = 0.01f*cor_est + 0.99f*lt_cor_est;
lt_tn_track = 0.03f* (Etot − totalNoise < 10) + 0.97f*lt_tn_track;
    lt_tn_dist = 0.03f* (Etot − totalNoise) + 0.97f*lt_tn_dist;
    lt_Ellp_dist = 0.03f* (Etot − Etot_l_lp) + 0.97f*lt_Ellp_dist;
    harm_cor_cnt
    low_tn_track_cnt
```

Figure 7:
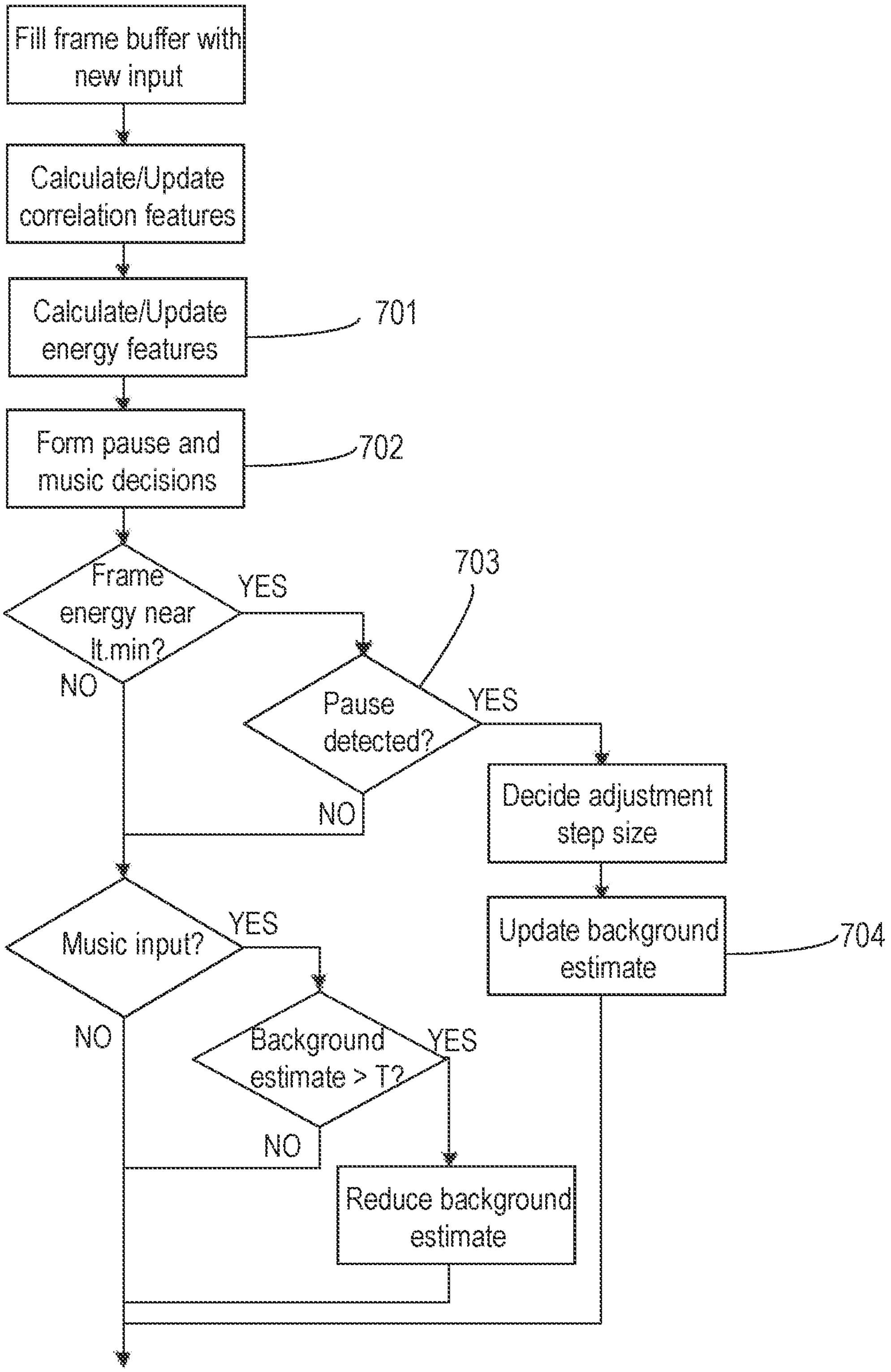
FIG. 7 is a flow chart illustrating a background update decision logic from the solution described in Annex A.

The noise update logic from the solution given in Annex A is shown in FIG. 7. The improvements, related to the solution described herein, of the noise estimator of Annex A are mainly related to the part 701 where features are calculated; the part 702, where pause decisions are made based on different parameters; and further to the part 703, where different actions are taken based on whether a pause is detected or not. Further, the improvements may have an effect on the updating 704 of the background noise estimate, which could e.g. be updated when a pause is detected based on the new features, which would not have been detected before introducing the solution described herein. In the exemplifying implementation described here, the new features introduced herein are calculated as follows, starting with non_staB, which is determined using the current frame's sub-band energies enr[i], which corresponds to Ecb(i) above and in FIG. 6, and the current background noise estimate bckr[i], which corresponds to Ncb(i) above and in FIG. 6. The first part of the first code section below is related to a special initial procedure for the first 150 frames of an audio signal, before a proper background estimate has been derived.

```
/* calculate non-stationarity feature relative background (spectral
closeness feature non_staB */
if (ini_frame < 150)
{
  /* During init don't include updates */
  if ( i >= 2 && i <= 16 )
  {
    non_staB += (float)fabs(log(enr[i] + 1.0f) −
                log(E_MIN + 1.0f));
  }
}
else
{
  /* After init compare with background estimate */
  if ( i >= 2 && i <= 16 )
  {
    non_staB += (float)fabs(log(enr[i] + 1.0f) −
                log(bckr[i] + 1.0f));
  }
}
if (non_staB >= 128)
{
  non_staB = 32767.0/256.0f;
}
```

The code sections below show how the new features for the linear prediction residual energies, i.e. the for the linear prediction gain, are calculated. Here the residual energies are named epsP[m] (cf. E(m) used previously).

```
/*-----------------------------------------------------------*
* Linear prediction efficiency 0 to 2 order
*(linear prediction gain going from 0^th to 2^nd order model of linear prediction filter)
*-----------------------------------------------------------*/
epsP_0_2 = max(0, min(8, epsP[0] / epsP[2]));
epsP_0_2_lp = 0.15f * epsP_0_2 + (1.0f−0.15f) * st->epsP_0_2_lp;
epsP_0_2_ad = (float) fabs(epsP_0_2 − epsP_0_2_lp );
if (epsP_0_2_ad < epsP_0_2_ad_lp)
{
  epsP_0_2_ad_lp = 0.1f * epsP_0_2_ad + (1.0f − 0.1f) * epsP_0_2_ad_lp;
}
else
{
  epsP_0_2_ad_lp = 0.2f * epsP_0_2_ad + (1.0f − 0.2f) * epsP_0_2_ad_lp;
}
epsP_0_2_ad_lp_max = max(epsP_0_2_ad,st->epsP_0_2_ad_lp);
/*-------------------------------------------------------------*
```

-continued

```
* Linear predition efficiency 2 to 16 order
*(linear prediction gain going from 2nd to 16th order model of linear prediction filter)
*------------------------------------------------------------*/
epsP_2_16 = max(0, min(8, epsP[2] / epsP[16]));
if (epsP_2_16 > epsP_2_16_lp)
{
   epsP_2_16_lp = 0.2f * epsP_2_16 + (1.0f-0.2f) * epsP_2_16_lp;
}
else
{
   epsP_2_16_lp = 0.03f * epsP_2_16 + (1.0f-0.03f) * epsP_2_16_lp;
}
epsP_2_16_lp2 = 0.02f * epsP_2_16 + (1.0f-0.02f) * epsP_2_16_lp2;
epsP_2_16_dlp = epsP_2_16_lp-epsP_2_16_lp2;
if (epsP_2_16_dlp < epsP_2_16_dlp_lp2)
{
   epsP_2_16_dlp_lp2 = 0.02f * epsP_2_16_dlp + (1.0f-0.02f) * epsP_2_16_dlp_lp2;
}
else
{
   epsP_2_16_dlp_lp2 = 0.05f * epsP_2_16_dlp + (1.0f-0.05f) * epsP_2_16_dlp_lp2;
}
   epsP_2_16_dlp_max = max(epsP_2_16_dlp,epsP_2_16_dlp_lp2);
```

The code below illustrates the creation of combined metrics, thresholds and flags used for the actual update decision, i.e. the determining of whether to update the background noise estimate or not. At least some of the parameters related to linear prediction gains and/or spectral closeness are indicated in bold text.

```
comb_ahc_epsP = max(max(act_pred,lt_haco_ev),epsP_2_16_dlp);
comb_hcm_epsP = max(max(lt_haco_ev,epsP_2_16_dlp_max),epsP_0_2_ad_lp_max);
haco_ev_max = max(st_harm_cor_cnt==0,>lt_haco_ev);
Etot_l_lp_thr = st->Etot_l_lp + (1.5f +1.5f * (Etot_lp<50.0f))*Etot_v_h2;
enr_bgd = Etot < Etot_l_lp_thr;
cns_bgd = (epsP_0_2 > 7.95f) && (non_sta< 1e3f);
lp_bgd = epsP_2_16_dlp_max < 0.10f;
ns_mask = non_sta < 1e5f;
lt_haco_mask = lt_haco_ev < 0.5f;
bg_haco_mask = haco_ev_max < 0.4f;
SD_1 = ( (epsP_0_2_ad > 0.5f) && (epsP_0_2 > 7.95f) );
bgbgd3 = enr_bgd || ( (cns_bgd || lp_bgd) && ns_mask && lt_haco_mask && SD_1==0 );
PD_1 = (epsP_2_16_dlp_max < 0.10f );
PD_2 = (epsP_0_2_ad_lp_max < 0.10f );
PD_3 = (comb_ahc_epsP < 0.85f);
PD_4 = comb_ahc_epsP < 0.15f;
PD_5 = comb_hcm_epsP < 0.30f;
BG_1 = ( (SD_1==0) || (Etot < Etot_l_lp_thr) ) && bg_haco_mask && (act_pred < 0.85f) && (Etot_lp < 50.0f);
PAU = (aEn==0) || ( (Etot < 55.0f) && (SD_1==0) && (( PD_3 && (PD_1 || PD_2)) || ( PD_4 || PD_5 ) ) );
NEW_POS_BG = (PAU | BG_1) & bg_bgd3;
/* Original silence detector works in most cases */
aE_bgd = aEn == 0;
/* When the signal dynamics is high and the energy is close to the background estimate */
sd1_bgd = (st->sign_dyn_lp > 15) && (Etot - st->Etot_l_lp) < 2*st->Etot_v_h2 && st->harm_cor_cnt > 20;
/* init conditions steadily dropping act_pred and/or lt_haco_ev */
tn_ini = ini_frame < 150 && harm_cor_cnt > 5 &&
          ( (st->act_pred < 0.59f && st->lt_haco_ev <0.23f) ||
           st->act_pred < 0.38f ||
           st->lt_haco_ev < 0.15f ||
           non_staB < 50.0f ||
           aE_bgd );
/* Energy close to the background estimate serves as a mask for other background detectors */
bg_bgd2 = Etot < Etot_l_lp_thr || tn_ini ;
```

As it is important not to do an update of the background noise estimate when a current frame or segment comprises active content, several conditions are evaluated in order to decide if an update is to be made. The major decision step in the noise update logic is whether an update is to be made or not, and this is formed by evaluation of a logical expression, which is underlined below. The new parameter NEW_POS_BG (new in relation to the solution in Annex A and WO2011/049514) is a pause detector, and is obtained based on the linear prediction gains going from 0th to $2^{nd}$, and from $2^{nd}$ to $16^{th}$ order model of a linear prediction filter, and tn_ini is obtained based on features related to spectral closeness. Here follows a decision logic using the new features, according to the exemplifying embodiment.

```
  updt_step=0.0f;
  if (( bq bqd2 && ( aE bqd || sd1 bqd || lt tn track >0.90f || NEW POS BG ) ) ||
    tn_ini )
  {
   if( ( ( act_pred < 0.85f ) &&
    aE_bgd &&
   ( lt_Ellp_dist < 10 || sd1_bgd ) && lt_tn_dist<40 &&
   ( ( Etot - totalNoise) < 10.0f ) ) ||
  ( st->first_noise_updt == 0 && st->harm_cor_cnt > 80 && aE_bgd && st->lt_aEn_zero > 0.5f ) ||
  (tn_ini && ( aE_bgd || non_staB < 10.0 || st->harm_cor_cnt > 80 ) )
 )
 {
updt_step=1.0f;
st->first_noise_updt = 1;
for( i=0; i<NB_BANDS; i++)
{
    st->bckr[i] = tmpN[i];
    }
   }
  else if ( ( ( st->act_pred < 0.80f) && (aE_bgd || PAU ) && st->lt_haco_ev < 0.10f) ||
      ( ( st->act_pred < 0.70f ) && ( aE_bgd || non_staB < 17.0f) && PAU && st->lt_haco_ev < 0.15f ) ||
      ( st->harm_cor_cnt > 80 && st->totalNoise > 5.0f && Etot < max(1.0f,Etot_l_lp +1.5f* st->Etot_v h2) )_
||
      ( st->harm_cor_cnt > 50 && st->first_noise_updt > 30 && aE_bgd && st->lt_aEn_zero>0.5f ) ||
      tn_ini
    )
 {
  updt_step=0.1f;
  if ( !aE_bgd &&
    st->harm_cor_cnt < 50 &&
            ( st->act_pred > 0.6f ||
              ( !tn_ini && Etot_l_lp - st->totalNoise < 10.0f && non_staB > 8.0f ) ) )
    {
      updt_step=0.01f;
    }
    if (updt_step > 0.0f)
    {
      st->first_noise_updt = 1;
      for( i=0; i< NB_BANDS; i++ )
      {
        st->bckr[i] = sf->bckr[i] + updt_step * (tmpN[i]-st->bckr[i]);
      }
    }
  }
  else if (aE_bgd || st->harm_cor_cnt > 100 )
  {
    ( st->first_noise_updt) += 1;
  }
}
else
{
  /* If in music lower bckr to drop further */
  if ( st->low_tn_track_cnt > 300 && st->lt_haco_ev >0.9f && st->total Noise > 0.0f)
  {
    updt_step=-0.02f;
    for( i=0; i< NB_BANDS; i++ )
    {
      if (st->bckr[i] > 2*E_MIN)
      {
        st->bckr[i] = 0.98f*st->bckr[i];
      }
    }
  }
}
st->lt_aEn_zero = 0.2f * (st->aEn==0) + (1-0.2f)*st->lt_aEn_zero;
```

As previously indicated, the features from the linear prediction provide level independent analysis of the input signal that improves the decision for background noise update which is particularly useful in the SNR range 10 to 20 dB, where energy based SAD's have limited performance due to the normal dynamic range of speech signals The background closeness features also improves background noise estimation as it can be used both for initialization and normal operation. During initialization, it can allow quick initialization for (lower level) background noise with mainly low frequency content, common for car noise. Also the features can be used to prevent noise updates of using low energy frames with a large difference in frequency characteristics compared to the current background estimate, suggesting that the current frame may be low level active content and an update could prevent detection of future frames with similar content.

Figure 8:
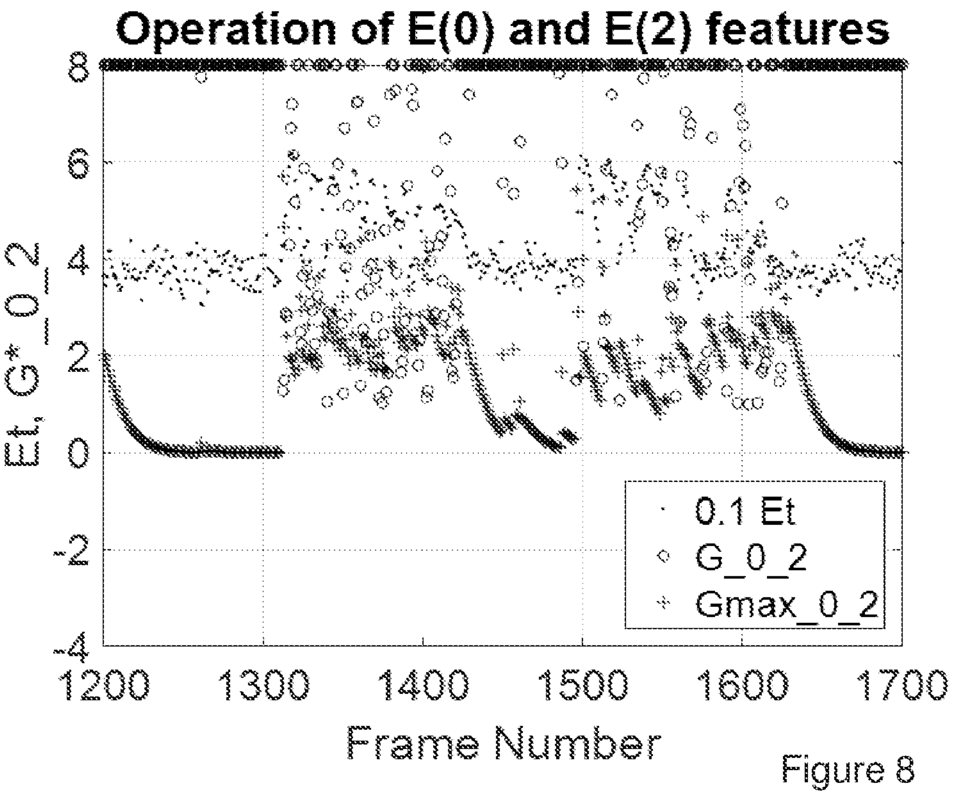
FIGS. 8-10 are diagrams illustrating the behaviour of different parameters presented herein when calculated for an audio signal comprising two speech bursts.
Figure 9A:
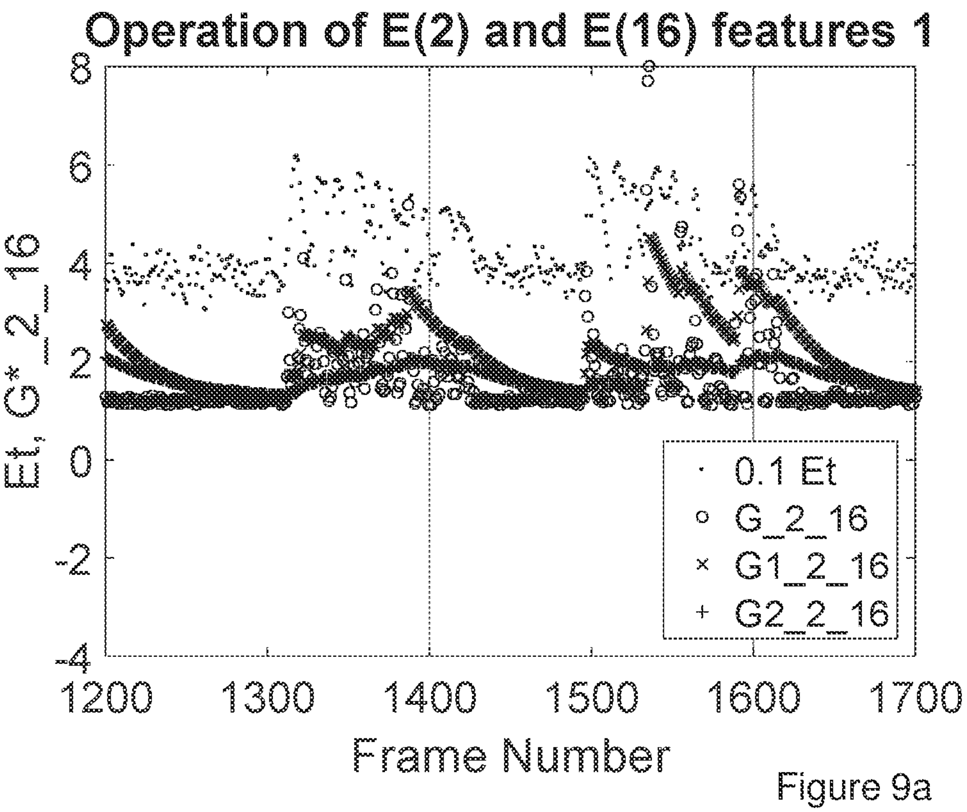
Figure 9B:
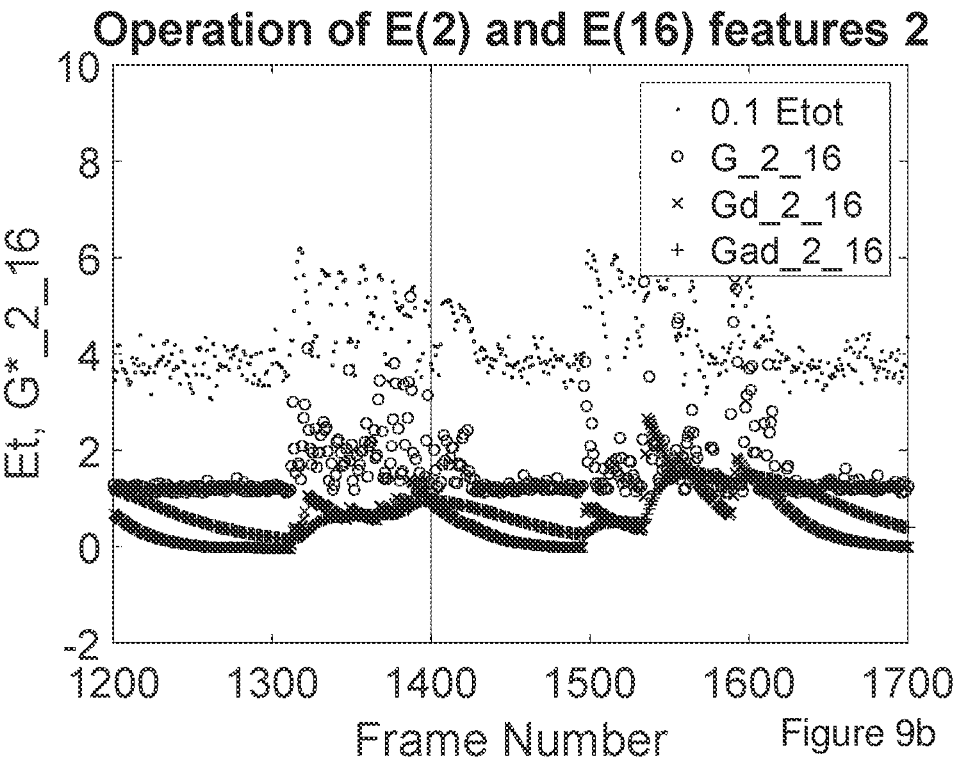
Figure 9C:
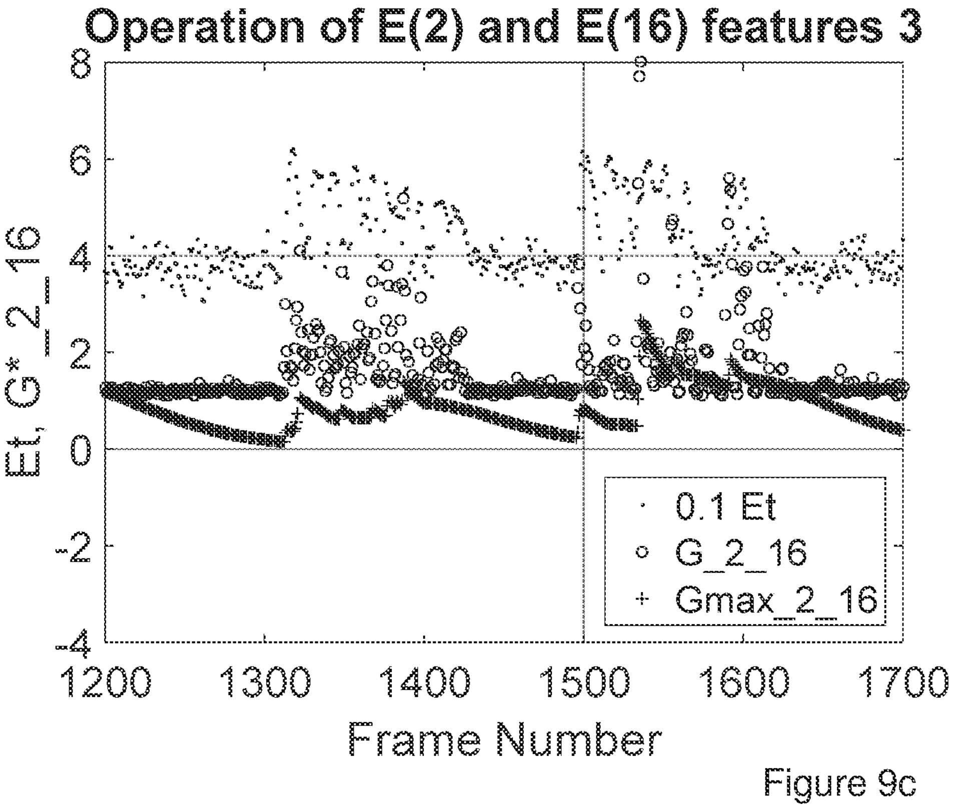
Figure 10:
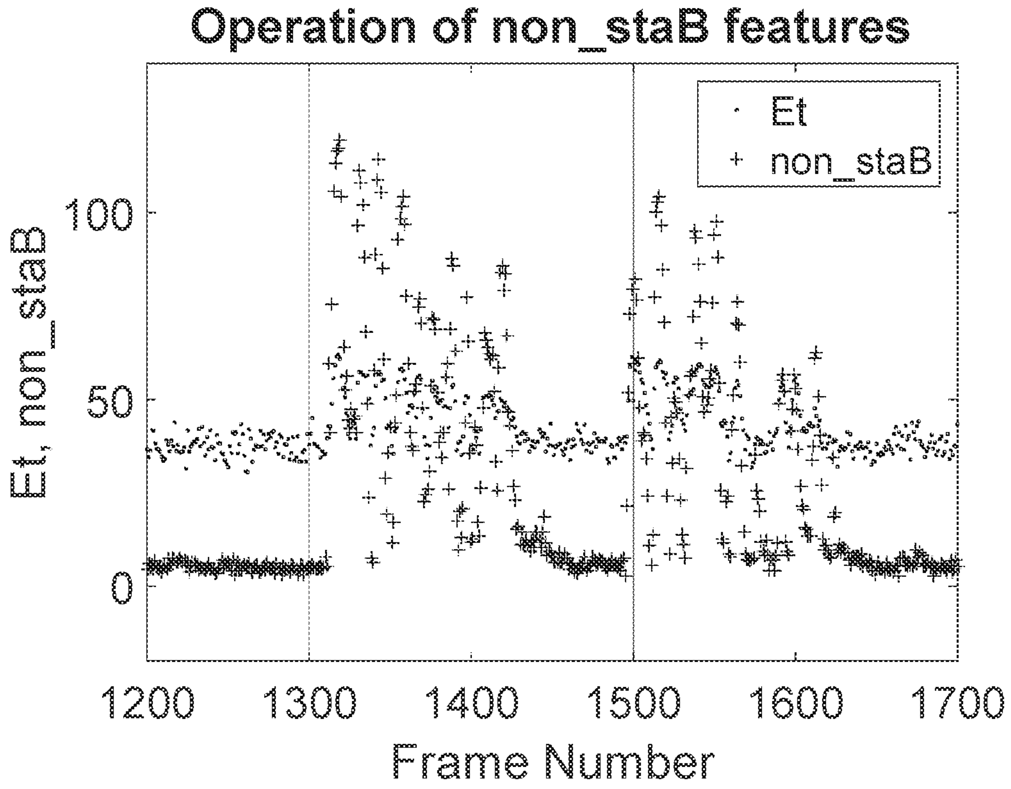

FIGS. 8-10 show how the respective parameters or metrics behave for speech in background at 10 dB SNR car noise. In the FIGS. 8-10 the dots, "•", each represent the frame energy. For the FIGS. 8 and 9*a-c*, the energy has been divided by 10 to be more comparable for the G_0_2 and G_2_16 based features. The diagrams correspond to an audio signal comprising two utterances, where the approximate position for the first utterance is in frames 1310-1420 and for the second utterance, in frames 1500-1610.

FIG. 8 shows the frame energy (/10) (dot, "•") and the features G_0_2 (circle, "○") and Gmax_0_2 (plus, "+"), for 10 dB SNR speech with car noise. Note that the G_0_2 is 8 during the car noise as there is some correlation in the signal that can be modeled using linear prediction with model order 2. During utterances the feature Gmax_0_2 becomes over 1.5 (in this case) and after the speech burst it drops to 0. In a specific implementation of a decision logic, the Gmax_0_2 needs to be below 0.1 to allow noise updates using this feature.

FIG. 9*a* shows the frame energy (/10) (dot, "•") and the features G_2_16 (circle, "○"), G1_2_16 (cross, "x"), G2_2_16 (plus, "+"). FIG. 9*b* shows the frame energy (/10) (dot, "•"), and the features G_2_16 (circle, "○") Gd_2_16 (cross, "x"), and Gad_2_16 (plus, "+"). FIG. 9*c* shows the frame energy (/10) (dot, "•") and the features G_2_16 (circle, "○") and Gmax_2_16 (plus, "+"). The diagrams shown in FIGS. 9*a-c* also relate to 10 dB SNR speech with car noise. The features are shown in three diagrams in order to make it easier to see each parameter. Note that the G_2_16 (circle, "○") is just above 1 during the car noise (i.e. outside utterances) indicting that the gain from the higher model order is low for this type of noise. During utterances the feature Gmax_2_16 (plus, "+" in FIG. 9*c*) increases, and then start to drop back to 0. In a specific implementation of a decision logic the feature Gmax_2_16, also has to become lower than 0.1 to allow noise updates. In this particular audio signal sample, this does not occur.

FIG. 10 shows the frame energy (dot, "•") (not divided by 10 this time) and the feature nonstaB (plus, "+") for 10 dB SNR speech with car noise. The feature nonstaB is in the range 0-10 during noise-only segments, and for utterances, it becomes much larger (as the frequency characteristics is different for speech). It should be noted, though, that even during the utterances there are frames where the feature nonstaB falls in the range 0-10. For these frames there might be a possibility to make background noise updates and thereby better track the background noise.

The solution disclosed herein also relates to a background noise estimator implemented in hardware and/or software.

Figure 11A:
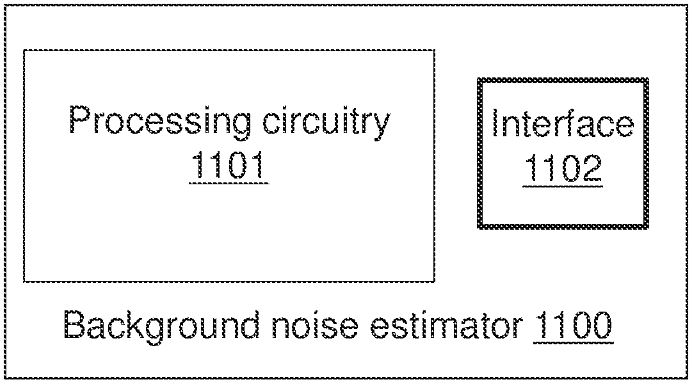
FIGS. 11*a*-11*c* and 12-13 are block diagrams illustrating different implementations of a background noise estimator according to exemplifying embodiments.
Figure 11B:
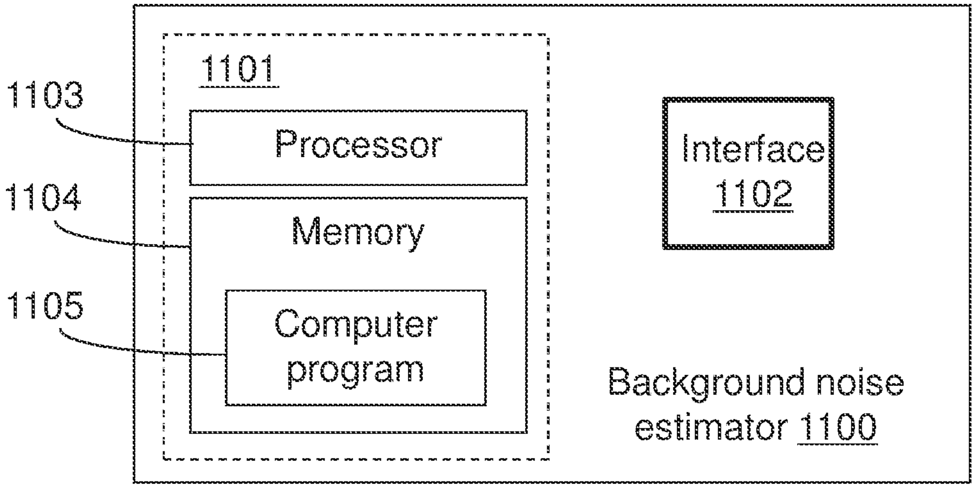
Figure 11C:
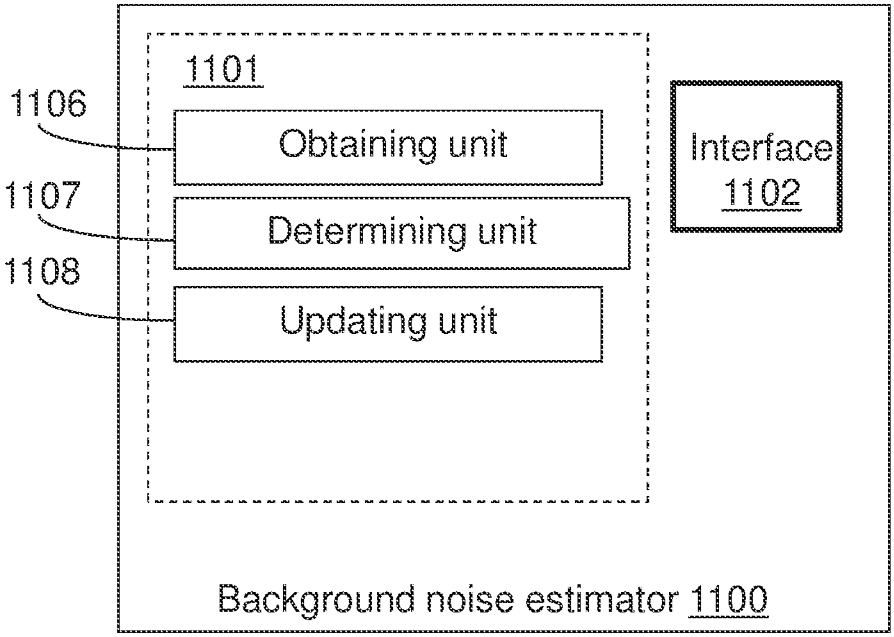

Background Noise Estimator, FIGS. 11*a*-11*c*

An exemplifying embodiment of a background noise estimator is illustrated in a general manner in FIG. 11*a*. By background noise estimator it is referred a module or entity configured for estimating background noise in audio signals comprising e.g. speech and/or music. The encoder 1100 is configured to perform at least one method corresponding to the methods described above with reference e.g. to FIGS. 2 and 7. The encoder 1100 is associated with the same technical features, objects and advantages as the previously described method embodiments. The background noise estimator will be described in brief in order to avoid unnecessary repetition.

The background noise estimator may be implemented and/or described as follows:

The background noise estimator 1100 is configured for estimating a background noise of an audio signal. The background noise estimator 1100 comprises processing circuitry, or processing means 1101 and a communication interface 1102. The processing circuitry 1101 is configured to cause the encoder 1100 to obtain, e.g. determine or calculate, at least one parameter, e.g. NEW_POS_BG, based on a first linear prediction gain calculated as a quotient between a residual signal from a 0th-order linear prediction and a residual signal from a 2nd-order linear prediction for the audio signal segment; and a second linear prediction gain calculated as a quotient between a residual signal from a 2nd-order linear prediction and a residual signal from a 16th-order linear prediction for the audio signal segment.

The processing circuitry 1101 is further configured to cause the background noise estimator to determine whether the audio signal segment comprises a pause, i.e. is free from active content such as speech and music, based on the at least one parameter. The processing circuitry 1101 is further configured to cause the background noise estimator to update a background noise estimate based on the audio signal segment when the audio signal segment comprises a pause.

The communication interface 1102, which may also be denoted e.g. Input/Output (I/O) interface, includes an interface for sending data to and receiving data from other entities or modules. For example, the residual signals related to the linear prediction model orders 0, 2 and 16 may be obtained, e.g. received, via the I/O interface from an audio signal encoder performing linear predictive coding.

The processing circuitry 1101 could, as illustrated in FIG. 11*b*, comprise processing means, such as a processor 1103, e.g. a CPU, and a memory 1104 for storing or holding instructions. The memory would then comprise instructions, e.g. in form of a computer program 1105, which when executed by the processing means 1103 causes the encoder 1100 to perform the actions described above.

An alternative implementation of the processing circuitry 1101 is shown in FIG. 11*c*. The processing circuitry here comprises an obtaining or determining unit or module 1106, configured to cause the background noise estimator 1100 to obtain, e.g. determine or calculate, at least one parameter, e.g. NEW_POS_BG, based on a first linear prediction gain calculated as a quotient between a residual signal from a 0th-order linear prediction and a residual signal from a 2nd-order linear prediction for the audio signal segment; and a second linear prediction gain calculated as a quotient between a residual signal from a 2nd-order linear prediction and a residual signal from a 16th-order linear prediction for the audio signal segment. The processing circuitry further comprises a determining unit or module 1107, configured to cause the background noise estimator 1100 to determine whether the audio signal segment comprises a pause, i.e. is free from active content such as speech and music, based at least on the at least one parameter. The processing circuitry 1101 further comprises an updating or estimating unit or module 1110, configured to cause the background noise estimator to update a background noise estimate based on the audio signal segment when the audio signal segment comprises a pause.

The processing circuitry 1101 could comprise more units, such as a filter unit or module configured to cause the background noise estimator to low pass filter the linear prediction gains, thus creating one or more long term estimates of the linear prediction gains. Actions such as low pass filtering may otherwise be performed e.g. by the determining unit or module 1107.

The embodiments of a background noise estimator described above could be configured for the different method embodiments described herein, such as limiting and low pass filtering the linear prediction gains; determining a difference between linear prediction gains and long term estimates and between long term estimates; and/or obtaining and using a spectral closeness measure, etc.

The background noise estimator 1100 may be assumed to comprise further functionality, for carrying out background noise estimation, such as e.g. functionality exemplified in Appendix A.

Figure 12:
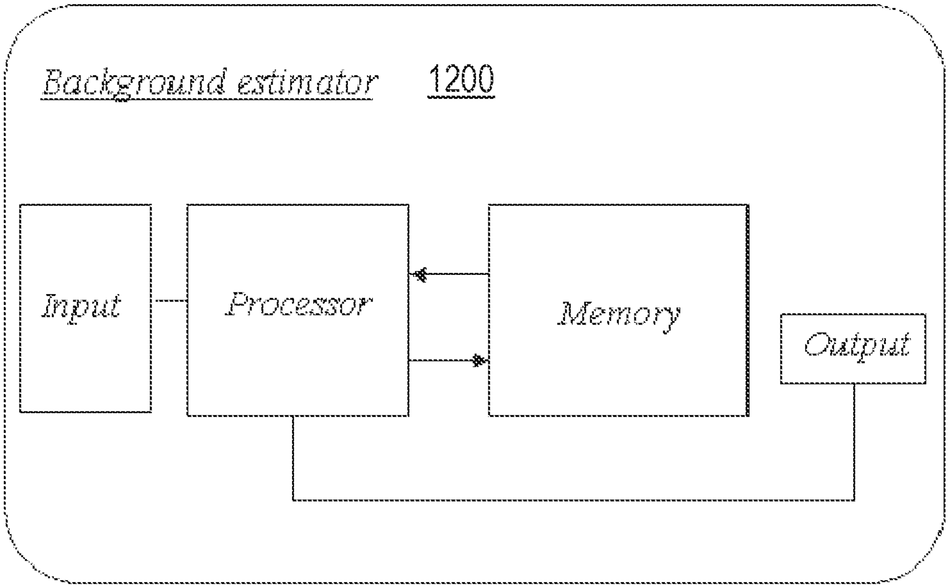

FIG. 12 illustrates a background estimator 1200 according to an exemplifying embodiment. The background estimator 1200 comprises an input unit e.g. for receiving residual energies for model orders 0, 2 and 16. The background estimator further comprises a processor and a memory, said memory containing instructions executable by said processor, whereby said background estimator is operative for: performing a method according an embodiment described herein.

Figure 13:
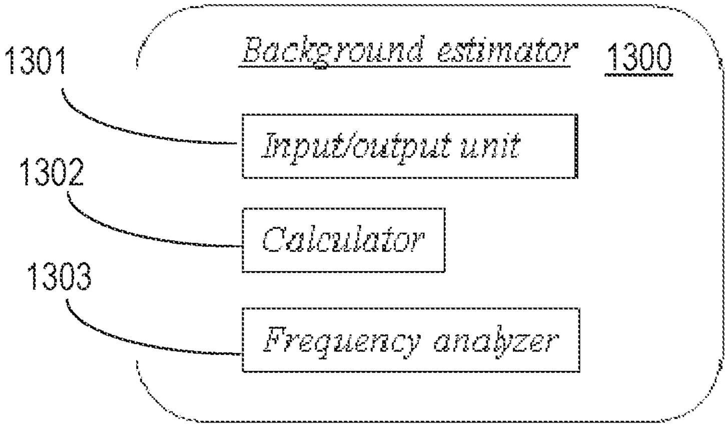
Figure 19:
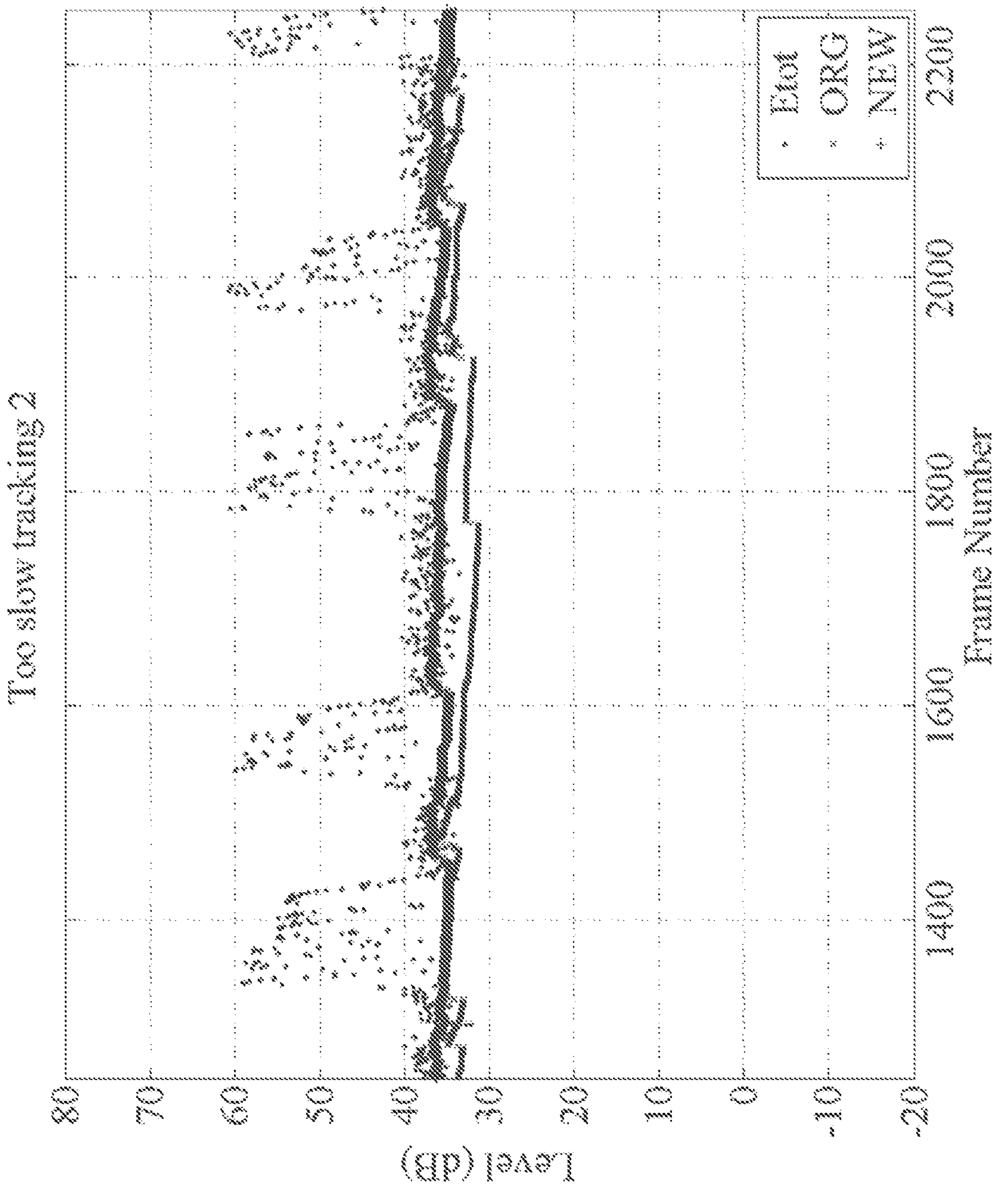
Figure 20:
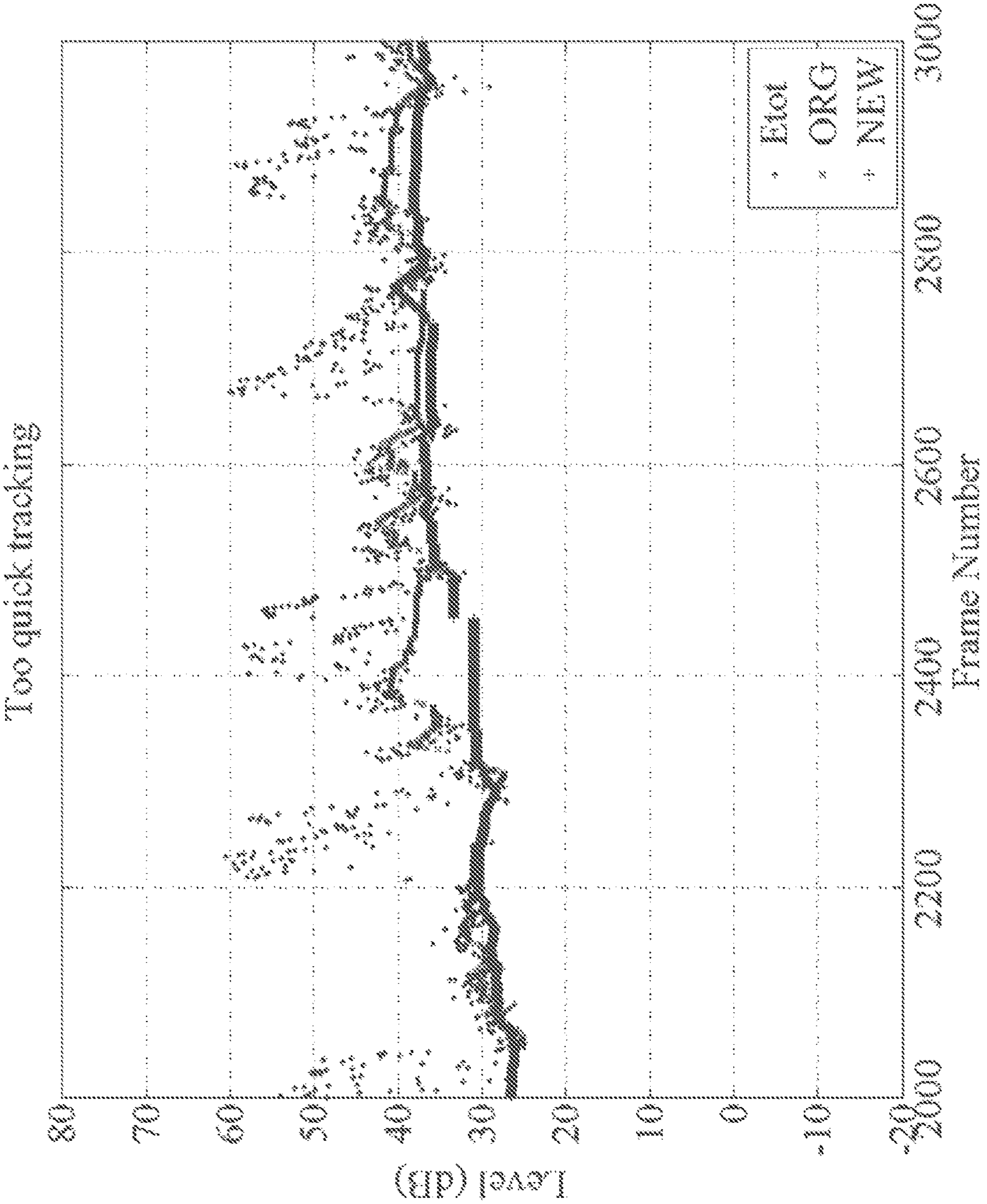
Figure 21:
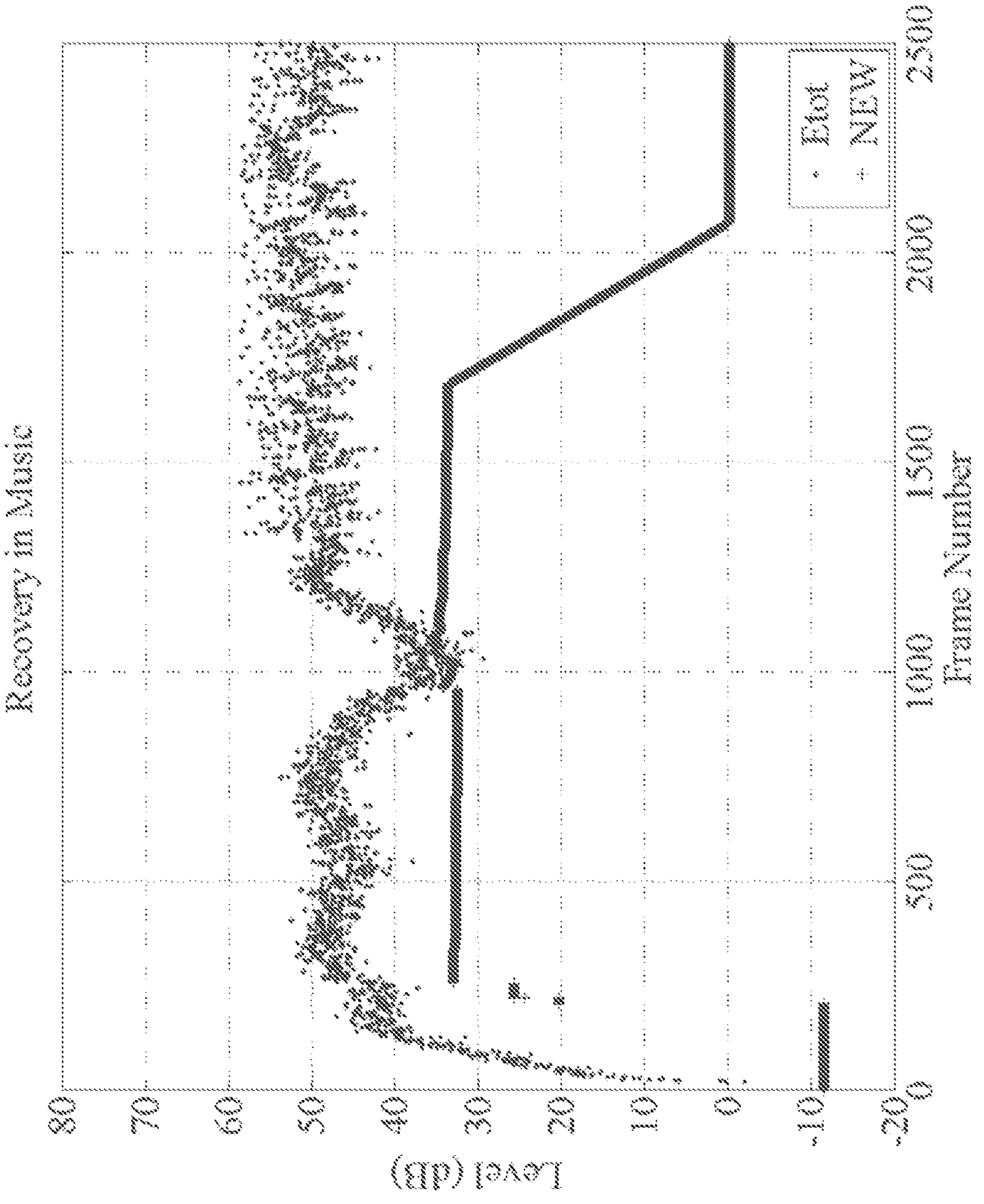

Accordingly, the background estimator may comprise, as illustrated in FIG. 13, an input/output unit 1301, a calculator 1302 for calculating the first two sets of features from the residual energies for model orders 0, 2 and 16 and a frequency analyzer 1303 for calculating the spectral closeness feature.

A background noise estimator as the ones described above may be comprised e.g. in a VAD or SAD, an encoder and/or a decoder, i.e. a codec, and/or in a device, such as a communication device. The communication device may be a user equipment (UE) in the form of a mobile phone, video camera, sound recorder, tablet, desktop, laptop, TV set-top box or home server/home gateway/home access point/home router. The communication device may in some embodiments be a communications network device adapted for coding and/or transcoding of audio signals. Examples of such communications network devices are servers, such as media servers, application servers, routers, gateways and radio base stations. The communication device may also be adapted to be positioned in, i.e. being embedded in, a vessel, such as a ship, flying drone, airplane and a road vehicle, such as a car, bus or lorry. Such an embedded device would typically belong to a vehicle telematics unit or vehicle infotainment system.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word “comprise” or “comprising” it shall be interpreted as non-limiting, i.e. meaning “consist at least of”.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In some instances herein, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Annex A

The references to figures in the text below are references to FIGS. 14-21, such that "FIG. 14" below corresponds to FIG. 14 in the drawings.

Figure 14:
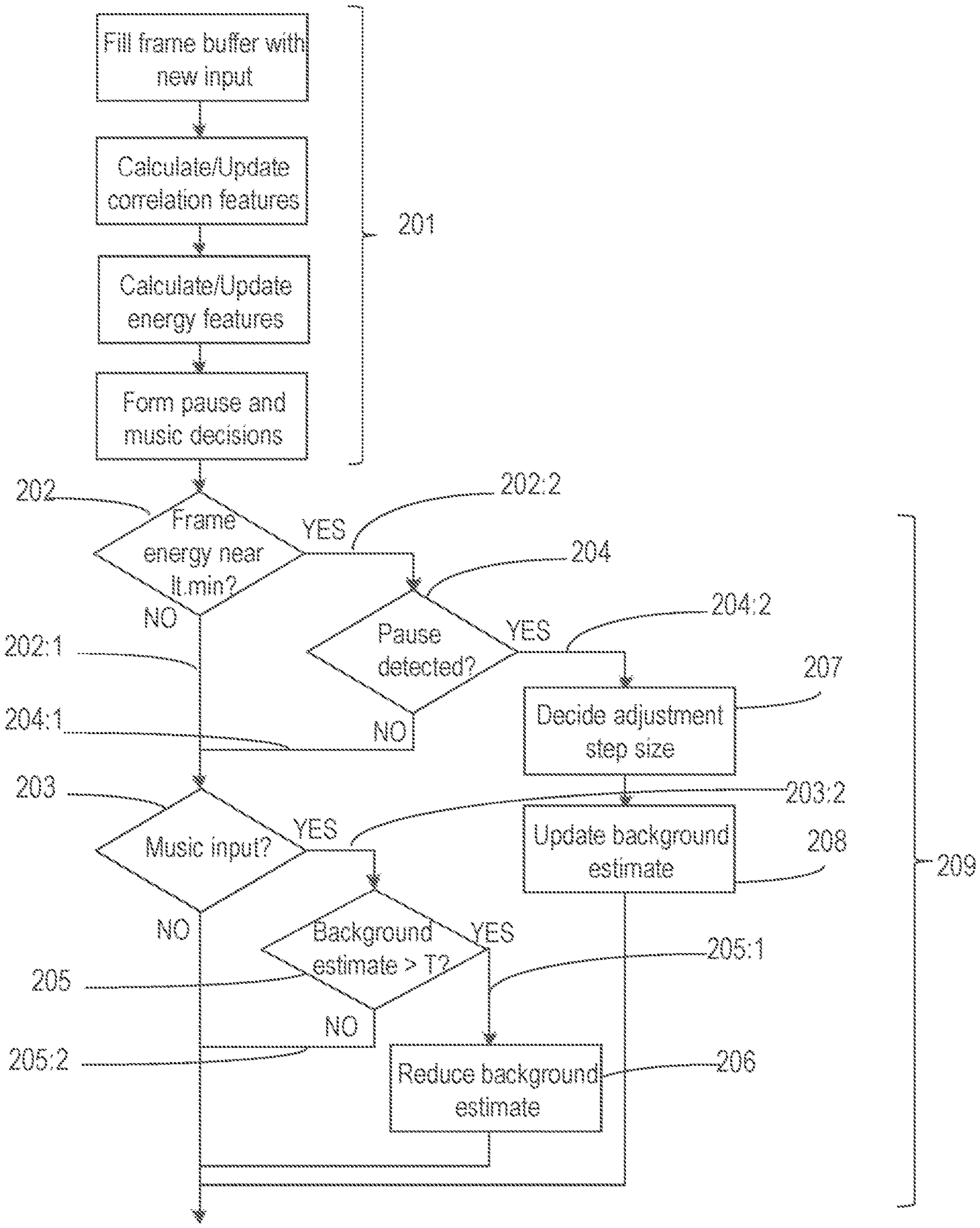
FIGS. 14-21 on figure pages marked "Annex A" are associated with Annex A, and are referred to in said Annex A with the numbers 14-21.
Figure 15:
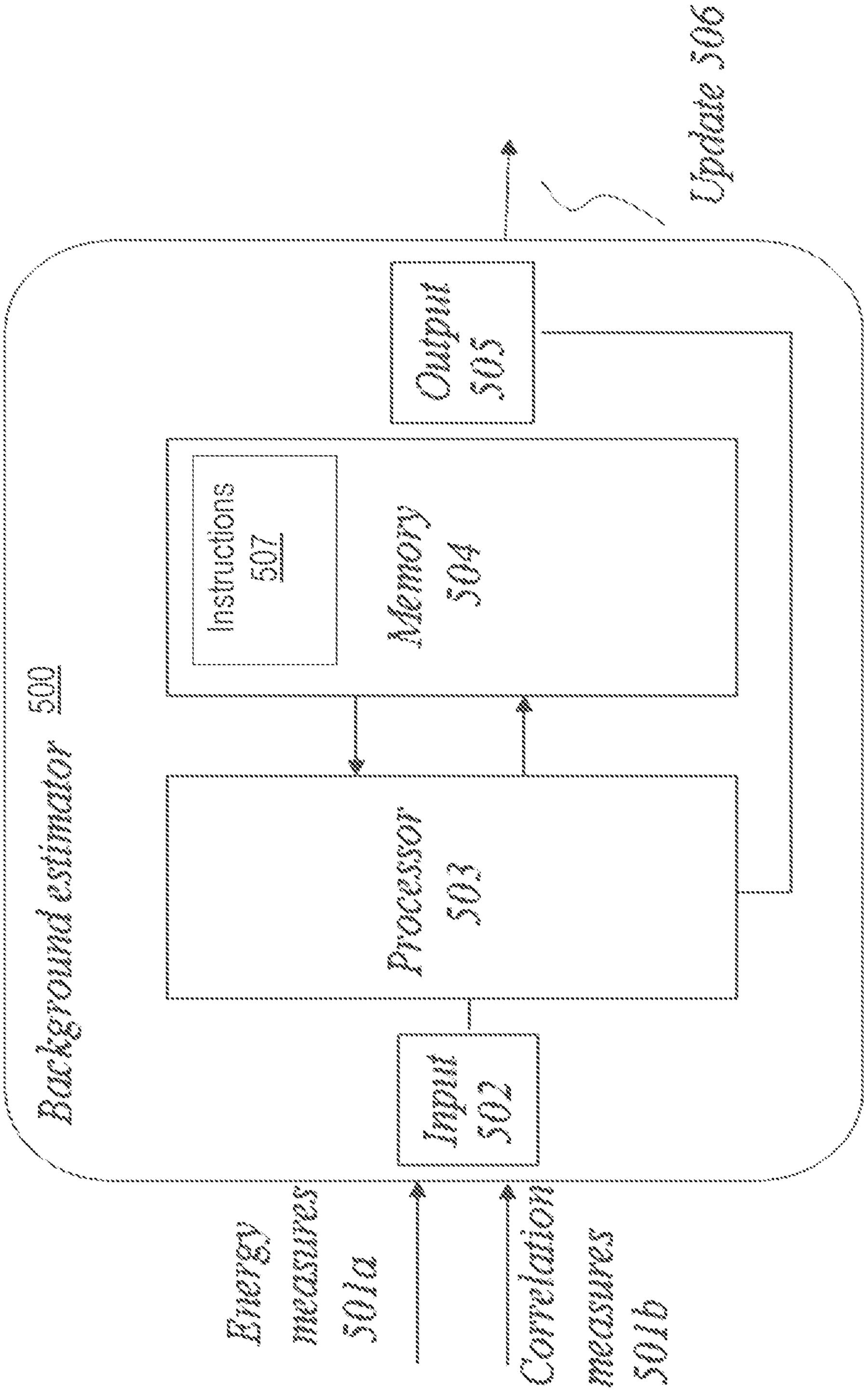
Figure 16:
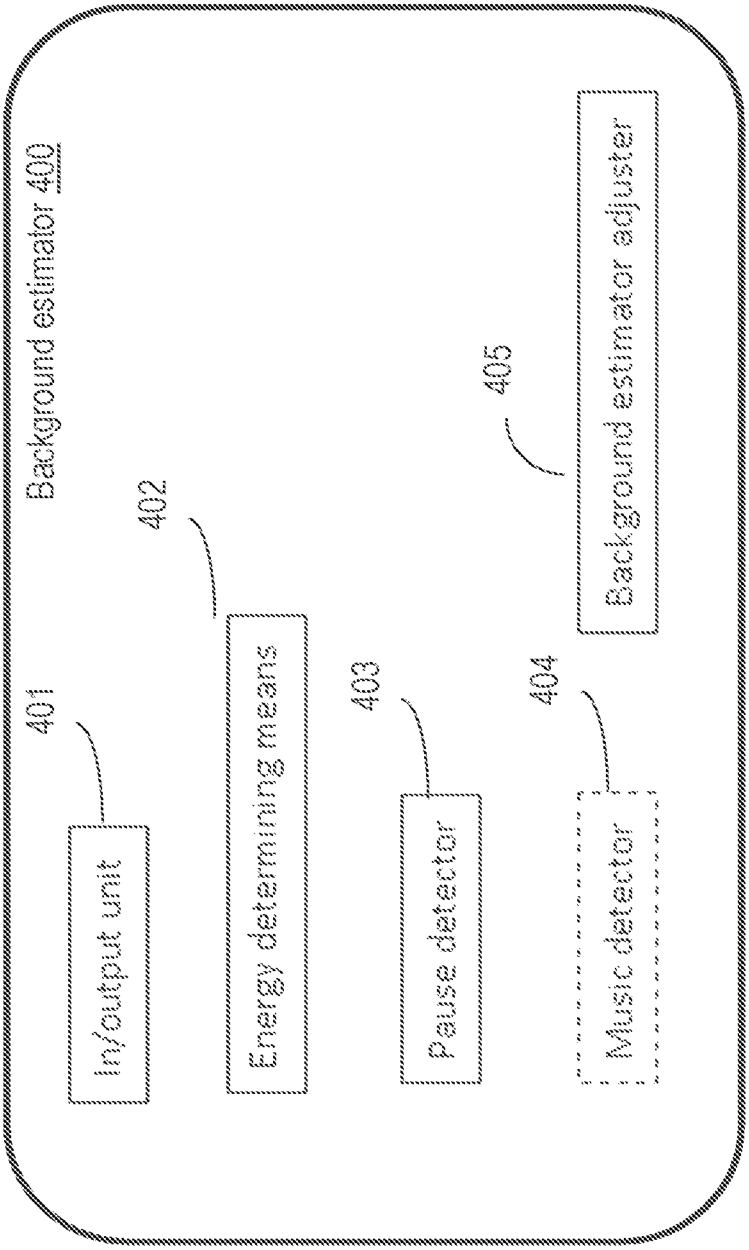

FIG. 14 is a flow chart illustrating an exemplifying embodiment of a method for background noise estimation according to the herein proposed technology. The method is intended to be performed by a background noise estimator, which may be part of a SAD. The background noise estimator, and the SAD, may further be comprised in an audio encoder, which may in its turn be comprised in a wireless device or a network node. For the described background noise estimator, adjusting the noise estimate down, is not restricted. For each frame a possible new sub-band noise estimate is calculated, regardless if the frame is background or active content, if the new value is lower than the current it is used directly as it most likely would be from a background frame. The following noise estimation logic is a second step where it is decided if the sub-band noise estimate can be increased and if so how much, the increase is based on the previously calculated possible new sub-band noise estimate. Basically this logic forms the decision of the current frame is a background frame and if it is not sure it may allow a smaller increase compared to what was originally estimated.

The method illustrated in FIG. 14 comprises: when an energy level of an audio signal segment is more than a threshold higher 202:1 than a long term minimum energy level, lt_min, or, when the energy level of the audio signal segment is less than a threshold higher 202:2 than lt_min, but no pause is detected 204:1 in the audio signal segment:

reducing 206 a current background noise estimate when the audio signal segment is determined 203:2 to comprise music and the current background noise estimate exceeds a minimum value 205:1, denoted "T" in FIG. 14, and further exemplified e.g. as 2*E_MIN in code below.

By performing the above, and providing the background noise estimate to a SAD, the SAD is enabled to perform more adequate sound activity detection. Further, recovery from erroneous background noise estimate updates is enabled.

The energy level of the audio signal segment used in the method described above may alternatively be referred to e.g. as the current frame energy, Etot, or as the energy of the signal segment, or frame, which can be calculated by summing the sub-band energies for the current signal segment.

The other energy feature used in the method above, i.e. the long term minimum energy level, lt_min, is an estimate, which is determined over a plurality of preceding audio signal segments or frames. lt_min could alternatively be denoted e.g. Etot_l_lp One basic way of deriving lt_min would be to use the minimum value of the history of current frame energy over some number of past frames. If the value calculated as: "current frame energy—long term minimum estimate" is below a threshold value, denoted e.g. THR1, the current frame energy is herein said to be close to the long term minimum energy, or to be near the long term minimum energy. That is, when (Etot−lt_min)<THR1, the current frame energy, Etot, may be determined 202 to be near the long term minimum energy lt_min. The case when (Etot−lt_min)=THR1 may be referred to either of the decisions, 202:1 or 202:2, depending on implementation. The numbering 202:1 in FIG. 14 indicates the decision that the current frame energy is not near lt_min, while 202:2 indicates the decision that the current frame energy is near lt_min. Other numbering in FIG. 14 on the form XXX:Y indicates corresponding decisions. The feature lt_min will be further described below.

The minimum value, which the current background noise estimate is to exceed, in order to be reduced, may be assumed to be zero or a small positive value. For example, as will be exemplified in code below, a current total energy of the background estimate, which may be denoted "totalNoise" and be determined e.g. as 10*log 10Σbackr[i], may be required to exceed a minimum value of zero in order for the reduction to come in question. Alternatively, or in addition, each entry in a vector backr[i] comprising the sub-band background estimates may be compared to a minimum value, E_MIN, in order for the reduction to be performed. In the code example below, E_MIN is a small positive value.

It should be noted that according to a preferred embodiment of the solution suggested herein, the decision of whether the energy level of the audio signal segment is more than a threshold higher than lt_min is based only on information derived from the input audio signal, that is, it is not based on feedback from a sound activity detector decision.

The determining 204 of whether a current frame comprises a pause or not may be performed in different ways based on one or more criteria. A pause criterion may also be referred to as a pause detector. A single pause detector could be applied, or a combination of different pause detectors. With a combination of pause detectors each can be used to detect pauses in different conditions. One indicator of that a current frame may comprise a pause, or inactivity, is that a correlation feature for the frame is low, and that a number of preceding frames also have had low correlation features. If the current energy is close to the long term minimum energy and a pause is detected, the background noise can be updated according to the current input, as illustrated in FIG. 14. A pause may be considered to be detected when, in addition to that the energy level of the audio signal segment is less than a threshold higher than lt_min: a predefined number of consecutive preceding audio signal segments have been determined not to comprise an active signal and/or a dynamic of the audio signal exceeds a threshold. This is also illustrated in the code example further below.

The reduction 206 of the background noise estimate enables handling of situations where the background noise estimate has become "too high", i.e. in relation to a true background noise. This could also be expressed e.g. as that the background noise estimate deviates from the actual background noise. A too high background noise estimate may lead to inadequate decisions by the SAD, where the current signal segment is determined to be inactive even though it comprises active speech or music. A reason for the background noise estimate becoming too high is e.g. erroneous or unwanted background noise updates in music, where the noise estimation has mistaken music for background and allowed the noise estimate to be increased. The disclosed method allows for such an erroneously updated background noise estimate to be adjusted e.g. when a following frame of the input signal is determined to comprise music. This adjustment is done by a forced reduction of the background noise estimate, where the noise estimate is scaled down, even if the current input signal segment energy is higher than the current background noise estimate, e.g. in a sub-band. It should be noted that the above described logic for background noise estimation is used to control the increase of background sub-band energy. It is always allowed to lower the sub-band energy when the current frame sub-band energy is lower than the background noise estimate. This function is not explicitly shown in FIG. 14. Such a decrease usually has a fixed setting for the step size. However, the background noise estimate should only be allowed to be increased in association with the decision logic according to the method described above. When a pause is detected, the energy and correlation features may also be used for deciding 207 how large the adjustment step size for the background estimate increase should be before the actual background noise update is made.

As previously mentioned, some music segments can be difficult to separate from background noise, due to that they are very noise like. Thus, the noise update logic may accidentally allow for increased sub-band energy estimates, even though the input signal was an active signal. This can cause problems as the noise estimate can become higher than they should be.

In prior art background noise estimators, the sub-band energy estimates could only be reduced when an input sub-band energy went below a current noise estimate. However, since some music segments can be difficult to separate from background noise, due to that they are very noise like, the inventors have realized that a recovery strategy for music is needed. In the embodiments described herein, such a recovery can be done by forced noise estimate reduction when the input signal returns to music-like characteristics. That is, when the energy and pause logic described above prevent, 202:1, 204:1, the noise estimation from being increased, it is tested 203 if the input is suspected to be music and if so 203:2, the sub-band energies are reduced 206 by a small amount each frame until the noise estimates reaches a lowest level 205:2.

A background estimator as the ones described above can be comprised or implemented in a VAD or SAD and/or in an encoder and/or a decoder, wherein the encoder and/or decoder can be implemented in a user device, such as a mobile phone, a laptop, a tablet, etc. The background estimator could further be comprised in a network node, such as a Media Gateway, e.g. as part of a codec.

Figure 17:
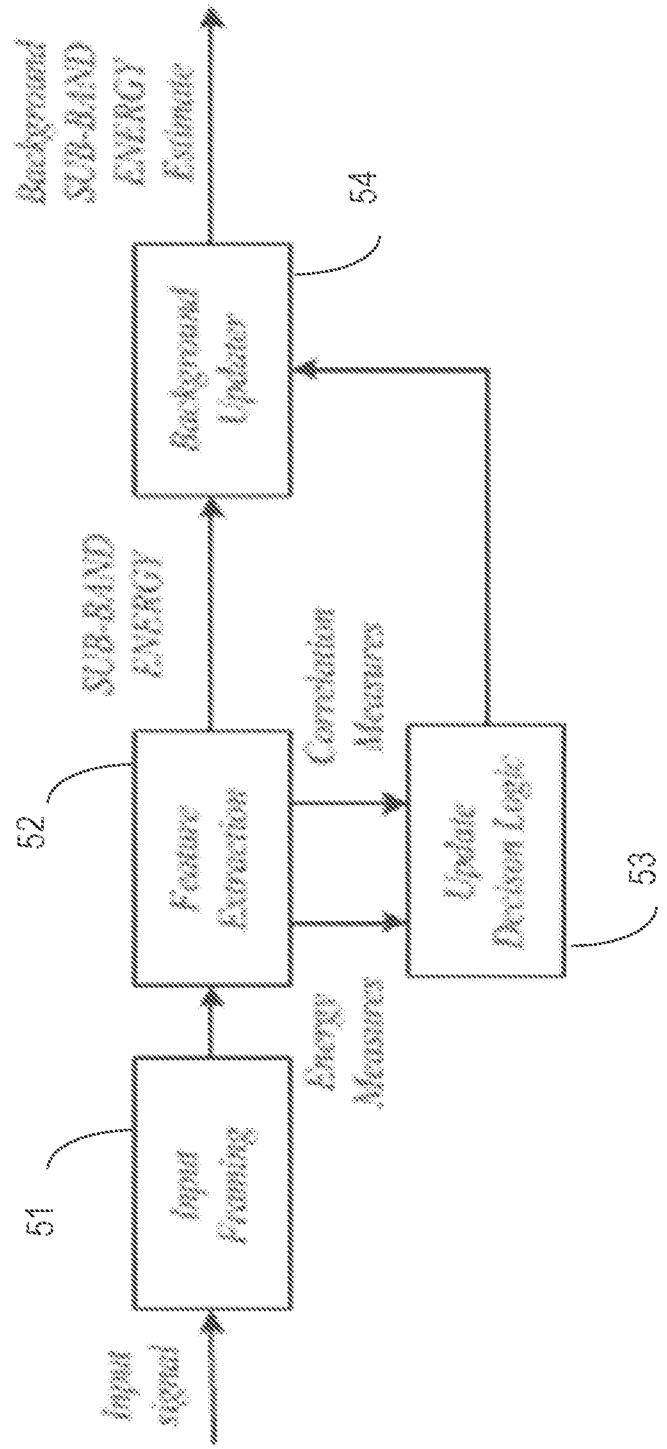
Figure 18:
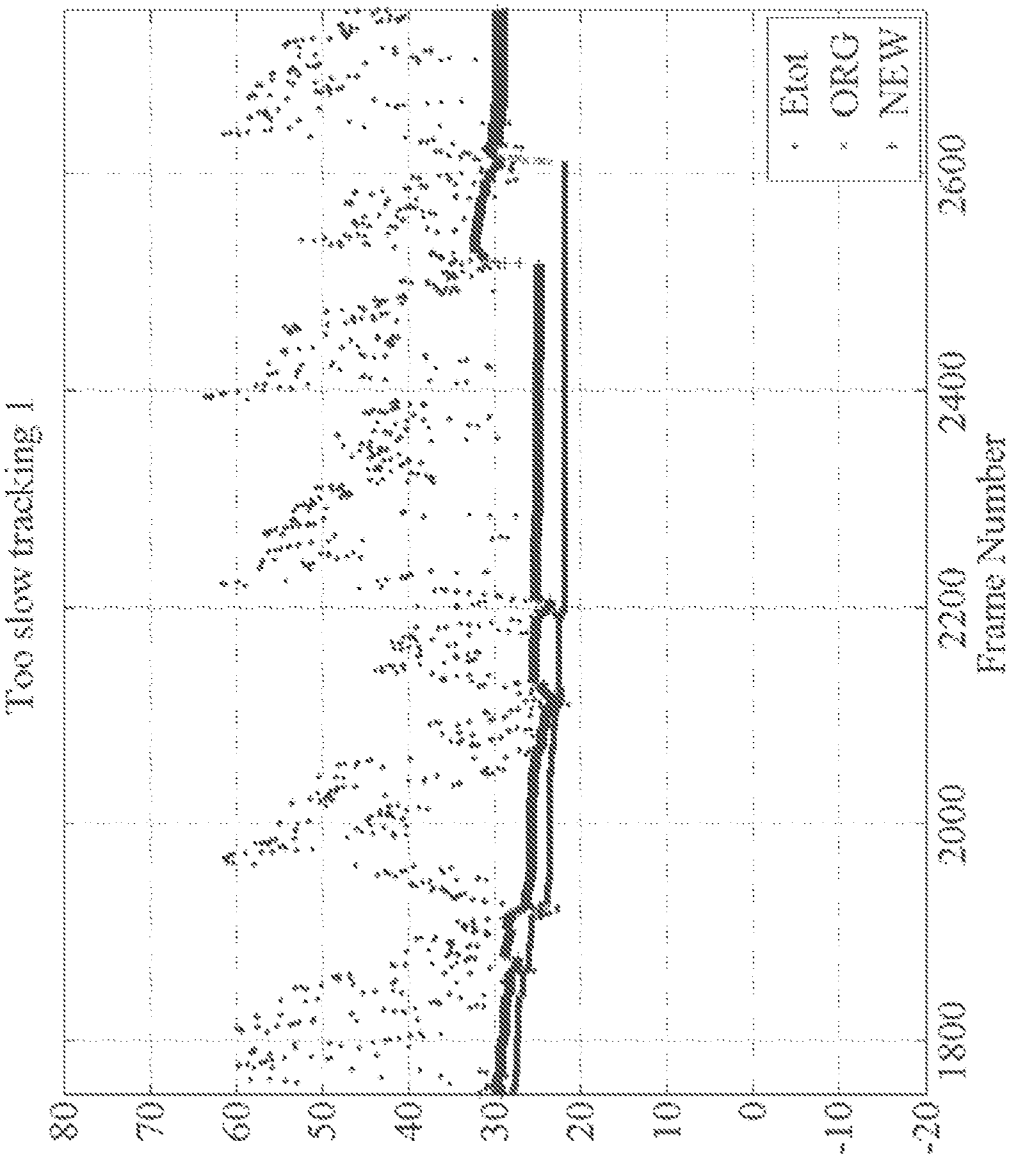

FIG. 17 is a block diagram schematically illustrating an implementation of a background estimator according to an exemplifying embodiment. An input framing block 51 first divides the input signal into frames of suitable length, e.g. 5-30 ms. For each frame, a feature extractor 52 calculates at least the following features from the input: 1) The feature extractor analyzes the frame in the frequency domain and the energy for a set of sub-bands are calculated. The sub-bands are the same sub-bands that are to be used for the background estimation. 2) The feature extractor further analyzes the frame in the time-domain and calculates a correlation denoted e.g. cor_est and/or lt_cor_est, which is used in determining whether the frame comprises active content or not. 3) The feature extractor further utilizes the current frame total energy, e.g. denoted Etot, for updating features for energy history of current and earlier input frames, such as the long term minimum energy, lt_min. The correlation and energy features are then fed to the Update Decision Logic block 53.

Here, a decision logic according to the herein disclosed solution is implemented in the Update Decision Logic block 53, where the correlation and energy features are used to form decisions on whether the current frame energy is close to a long term minimum energy or not; on whether the current frame is part of a pause (not active signal) or not; and whether the current frame is part of music or not. The solution according to the embodiments described herein involves how these features and decisions are used to update the background noise estimation in a robust way.

Below, some implementation details of embodiments of the solution disclosed herein will be described. The implementation details below are taken from an embodiment in a G.718 based encoder. This embodiment uses some of the features described in WO2011/049514 and WO2011/049515.

The following features are defined in the modified G.718 described in W02011/09514

| | |
|---|---|
| Etot; | The total energy for current input frame |
| Etot_l | Tracks the mininmum energy envelope |
| Etot_l_lp; | A Smoothed version of the mimimum energy envelope Etot_l |
| totalNoise; | The current total energy of the background estimate |
| bckr[i]; | The vector with the sub-band background estimates |
| tmpN[i]; | A precalculated potential new background estimate |
| aEn; | A background detector which uses multiple features (a counter) |
| harm_cor_cnt | Counts the frames since the last frame with correlation or harmonic event |
| act_pred | A prediction of activity from input frame features only |
| cor[i] | Vector with correlation estimates for, i = 0 end of current frame, i = 1 start of current frame, i = 2 end of previos frame |

The following features are defined in the modified G.718 described in W02011/09515

| | |
|---|---|
| Etot_h | Tracks the maximum energy envelope |
| sign_dyn_lp; | A smoothed input signal dynamics |

Also the feature Etot_v_h was defined in WO2011/049514, but in this embodiment it has been modified and is now implemented as follows:

```
Etot_v = (float) fabs(*Etot_last − Etot);
if( Etot_v < 7.0f)          /*note that no VAD flag or similar is used here*/
{
        *Etot_v_h −= 0.01f;
        if (Etot_v > *Etot_v_h)
        {
                if ((*Etot_v −*Etot_v_h) > 0.2f)
                {
                *Etot_v_h = *Etot_v_h+0.2f;
                }
                else
                {
                                *Etot_v_h = Etot_v;     }}}
```

Etot_v measures the absolute energy variation between frames, i.e. the absolute value of the instantaneous energy variation between frames. In the example above, the energy variation between two frames is determined to be "low" when the difference between the last and the current frame energy is smaller than 7 units. This is utilized as an indicator of that the current frame (and the previous frame) may be part of a pause, i.e. comprise only background noise. However, such low variance could alternatively be found e.g. in the middle of a speech burst. The variable Etot_last is the energy level of the previous frame.

The above steps described in code may be performed as part of the "calculate/update correlation and energy" steps in the flow chart in FIG. 14, i.e. as part of the actions 201. In the WO2011/049514 implementation, a VAD flag was used to determine whether the current audio signal segment comprised background noise or not. The inventors have realized that the dependency on feedback information may be problematic. In the herein disclosed solution, the decision of whether to update the background noise estimate or not is not dependent on a VAD (or SAD) decision.

Further, in the herein disclosed solution, the following features, which are not part of the WO2011/049514 implementation, may be calculated/updated as part of the same steps, i.e. the calculate/update correlation and energy steps illustrated in FIG. 14. These features are also used in the decision logic of whether to update the background estimate or not.

In order to achieve a more adequate background noise estimate, a number of features are defined below. For example, the new correlation related features cor_est and It_cor_est are defined. The feature cor_est is an estimate of the correlation in the current frame, and cor_est is also used to produce It_cor_est, which is a smoothed long-term estimate of the correlation.

cor_est=(cor[0]+cor[1]+cor[2])/3.0f;

st->It_cor_est=0.01f*cor_est+0.99f*st->It_cor_est;

As defined above, cor[i] is a vector comprising correlation estimates, and cor[0] represents the end of the current frame, cor[1] represents the start of the current frame, and cor[2] represents the end of a previous frame.

Further, a new feature, It_tn_track, is calculated, which gives a long term estimate of how often the background estimates are close to the current frame energy. When the current frame energy is close enough to the current background estimate this is registered by a condition that signals (1/0) if the background is close or not. This signal is used to form the long-term measure It_tn_track.

st->It_tn_track=0,03f*(Etot−st->totalNoise<10)+0.97f*st->It_tn_track;

In this example, 0,03 is added when the current frame energy is close to the background noise estimate, and otherwise the only remaining term is 0.97 times the previous value. In this example, "close" is defined as that the difference between the current frame energy, Etot, and the background noise estimate, totalNoise, is less than 10 units. Other definitions of "close" are also possible.

Further, the distance between the current background estimate, Etot, and the current frame energy, totalNoise, is used for determining a feature, It_tn_dist, which gives a long term estimate of this distance. A similar feature, It_Ellp_dist, is created for the distance between the long term minimum energy Etot_I_Ip and the current frame energy, Etot.

st->It_tn_dist=0.03f*(Etot−st->totalNoise)+0.97f*st->It_tn_dist;

st->It_Ellp_dist=0.03f*(Etot−st->Etot_I_Ip)+0.97f*st->It_EIlp_dist;

The feature harm_cor_cnt, introduced above, is used for counting the number of frames since the last frame having a correlation or a harmonic event, i.e. since a frame fulfilling certain criteria related to activity. That is, when the condition harm_cor_cnt==0, this implies that the current frame most likely is an active frame, as it shows correlation or a harmonic event. This is used to form a long term smoothed estimate, It_haco_ev, of how often such events occur. In this case the update is not symmetric, that is different time constants are used if the estimate is increased or decreased, as can be seen below.

```
if (st->harm_cor_cnt == 0)                         /*when probably active*/
{
  st->lt_haco_ev = 0,03f + 0.97f*st->lt_haco_ev;   /*increase long term estimate*/
}
else
{
  st->lt_haco_ev = 0.99f*st->lt_haco_ev;           /*decrease long term estimate */
}
```

A low value of the feature It_tn_track, introduced above, indicates that the input frame energy has not been close to the background energy for some frames. This is due to that It_tn_track is decreased for each frame where the current frame energy is not close to the background energy estimate. It_tn_track is increased only when the current frame energy is close to the background energy estimate as shown above. To get a better estimate of how long this "non-tracking", i.e. the frame energy being far from the background estimate, has lasted, a counter, low_tn_track_cnt, for the number of frames with this absence of tracking is formed as:

```
if (st->lt_tn_track<0.05f)          /*when lt_tn_track is low */
{
  st->low_tn_track_cnt++;           /*add 1 to counter */
}
else
{
  st->low_tn_track_cnt=0;           /*reset counter */
}
```

In the example above, "low" is defined as below the value 0.05. This should be seen as an exemplifying value, which could be selected differently.

For the step "Form pause and music decisions" illustrated in FIG. 14, the following three code expressions are used to form pause detection, also denoted background detection. In other embodiments and implementations, other criteria could also be added for pause detection. The actual music decision is formed in the code using correlation and energy features.

1: bg_bgd=Etot<Etot_I_Ip+0.6f*st->Etot_v_h;

bg_bgd will become "1" or "true" when Etot is close to the background noise estimate. bg_bgd serves as a mask for other background detectors. That is, if bg_bgd is not "true", the background detectors 2 and 3 below do not need to be evaluated. Etot_v_h is a noise variance estimate, which could alternatively be denoted $N_{var}$. Etot_v_h is derived from the input total energy (in log domain) using Etot_v which measures the absolute energy variation between frames. Note that the feature Etot_v_h is limited to only increase a maximum of a small constant value, e.g. 0.2 for each frame. Etot_I_Ip is a smoothed version of the minimum energy envelope Etot_I.

2: aE_bgd=st->aEn==0;

When aEn is zero, aE_bgd becomes "1" or "true". aEn is a counter which is incremented when an active signal is determined to be present in a current frame, and decreased when the current frame is determined not to comprise an active signal. aEn may not be incremented more than to a certain number, e.g. 6, and not be reduced to less than zero. After a number of consecutive frames, e.g. 6, without an active signal, aEn will be equal to zero.

3: sd1_bgd=(st->sign_dyn_Ip>15) && (Etot−st->Etot_I_Ip)<st->Etot_v_h && st->harm_cor_cnt>20; Here, sd1_bgd will be "1" or "true" when three different conditions are true: The signal dynamics, sign_dyn_Ip is high, in this example more than 15; The current frame energy is close to the background estimate; and: A certain number of frames have passed without correlation or harmonic events, in this example 20 frames.

The function of the bg_bgd is to be a flag for detecting that the current frame energy is close to the long term minimum energy. The latter two, aE_bgd and sd1_bgd represent pause or background detection in different conditions. aE_bgd is the most general detector of the two, while sd1_bgd mainly detects speech pauses in high SNR.

A new decision logic according to an embodiment of the technology disclosed herein, is constructed as follows in code below. The decision logic comprises the masking condition bg_bgd, and the two pause detectors aE_bgd and sd1_bgd. There could also be a third pause detector, which evaluates the long term statistics for how well the totalNoise tracks the minimum energy estimate. The conditions evaluated if the first line is true is decision logic on how large the step size should be, updt_step and the actual noise estimation update is the assignment of value to "st->bckr[i]=-". Note the tmpN[i] is a previously calculated potentially new noise level calculated according to the solution described in WO2011/049514. The decision logic below follows the part 209 of FIG. 14, which is partly indicated in connection with the code below

```
if (bg_bgd && (aE_bgd || sd1_bgd || st->lt_tn_track >0.90f ) )          /*if 202:2 and 204:2)*/
    {
        if(     (st->act_pred < 0.85f || ( aE_bgd && st->lt_haco_ev < 0.05f ) ) &&
                (st->lt_Ellp_dist < 10 || sd1_bgd ) && st->lt_tn_dist<40 &&
                ( (Etot - st->totalNoise) < 15.0f || st->lt_haco_ev < 0.10f) )       /*207*/
        {
            st->first_noise_updt = 1;
            for( i=0; i< NB_ BANDS;++ )
            {
                st->bckr[i] = tmpN[i)                                           /*208*/
            }
        else if (aE_bgd && st->lt_haco_ev < 0.15f)
        {
            updt_step=0.1f;
            if (st->act_pred > 0.85f)
            {
                updt_step=0.01f                                  /*207*/
```

-continued

```
            }
            if (updt_step > 0.0f)
            {
                st->first_noise_updt = 1;
                for[ i=0;i< NB_ BANDS;++)
                {
                        st->bckr[i] = st->bckr[i] + updt_step * (tmpN[i]-st->bckr[i]);      /*208*/
        }}}
        else
    {
        (st->first_noise_updt) +=1;
    }
}
else
{
        /* If in music lower bckr to drop further */ /*if 203:2 and 205:1*/
        If ( st->low_tn_track_cnt > 300 && st->lt_haco_ev > 0.9f && st-> totalNoise > 0.0f)
        {
          For( i=0;i<NB_BANDS;i++)
          {
            If (st->bckr[i] > 2 * E_MIN
            {
                    St->bckr[i] = 0.98f * st->bckr[i];          /*206*/
            }
          }
        }
        Else
        {
          (st->first_noise_updt) += 1
        }
    }
```

The code segment in the last code block starting with "/* If in music . . . */ contains the forced down scaling of the background estimate which is used if it is suspected that the current input is music. This is decided as a function: long period of poor tracking background noise compared to the minimum energy estimate, AND, frequent occurrences of harmonic or correlation events, AND, the last condition "totalNoise>0" is a check that the current total energy of the background estimate is larger than zero, which implies that a reduction of the background estimate may be considered. Further, it is determined whether "bckr[i]>2*E_MIN", where E_MIN is a small positive value. This is a check of each entry in a vector comprising the sub-band background estimates, such that an entry needs to exceed E_MIN in order to be reduced (in the example by being multiplied by 0.98). These checks are made in order to avoid reducing the background estimates into too small values. The embodiments improve the background noise estimation which allows improved performance of the SAD/VAD to achieve high efficient DTX solution and avoid the degradation in speech quality or music caused by clipping.

With the removal of the decision feedback described in W02011/09514 from the Etot_v_h, there is a better separation between the noise estimation and the SAD. This has benefits as that the noise estimation is not changed if/when the SAD function/tuning is changed. That is, the determining of a background noise estimate becomes independent of the function of the SAD. Also the tuning of the noise estimation logic becomes easier as one is not affected by secondary effects from the SAD when the background estimates are changed.

The invention claimed is:

1. An apparatus comprising:

at least one processor; and at least one memory storing instructions executable by the at least one processor to perform operations to:

compute a first linear prediction gain as a ratio of a residual energy from a first linear prediction and a residual energy from a second linear prediction of a higher order than the first linear prediction for an audio signal segment;

compute a second linear prediction gain calculated as a ratio of the residual energy from the second linear prediction and residual energy from a third linear prediction of a higher order than the second linear prediction for the audio signal segment;

wherein the computing the first linear prediction gain and the computing the second linear prediction gain comprises (a) limit the first and second linear prediction gains to take on values in a predefined interval, (b) create at least one long term estimate of each of the first and second linear prediction gains, wherein the long term estimate is further created based on earlier first and second linear prediction gains computed for at least one earlier audio signal segment that precedes the audio signal segment, (c) determine a difference between one of the first and second linear prediction gains and a long term estimate of the one of the first and second linear prediction gains and/or between two different long term estimates associated with the one of the first and second linear prediction gains, and (d) low pass filter the first and second linear prediction gains; and determine whether the audio signal segment comprises a pause based on a combined metric obtained from a combination of the first and second linear prediction gains.

2. An apparatus comprising:

at least one processor; and at least one memory storing instructions executable by the at least one processor to perform operations to:

compute a first linear prediction gain as a ratio of a residual energy from a first linear prediction and a residual energy from a second linear prediction of a higher order than the first linear prediction for an audio signal segment;

compute a second linear prediction gain calculated as a ratio of the residual energy from the second linear prediction and residual energy from a third linear prediction of a higher order than the second linear prediction for the audio signal segment;

wherein the computing the first linear prediction gain and the computing the second linear prediction gain comprises (a) limit the first and second linear prediction gains to take on values in a predefined interval, wherein the first and second linear prediction gains take on values between 0 and 8, and wherein the limiting of the first and second linear prediction gains is based on at least one of:

$$G\_0\_2=\max(0,\min(8,E(0)/E(2))),\text{ and}$$

$$G\_2\_16=\max(0,\min(8,E(2)/E(16)))$$

where G_0_2 comprises a limited first or second linear prediction gain, E(0) comprises a residual energy of an input signal, and E(2) comprises a residual energy after a 2nd order linear prediction, where G_2_16 comprises another limited first or second linear prediction gain and E(16) comprises a residual energy after a 16th order linear prediction, (b) create at least one long term estimate of each of the first and second linear prediction gains, wherein the long term estimate is further created based on earlier first and second linear prediction gains computed for at least one earlier audio signal segment that precedes the audio signal segment, wherein the creating the at least one long term estimate of each of the first and second linear prediction gains is based on:

$$G1\_2\_16EqE=(1-a)G1\_2\_16+a\ G\_2\_16$$

where G1_2_16 comprises a first long term estimate, where G_2_16 comprises a limited first or second linear prediction gain, wherein if G_2_16>G1_2_16, then a=0.2 else a=0.03, (c) determine a difference between one of the first and second linear prediction gains and a long term estimate of the one of the first and second linear prediction gains and/or between two different long term estimates associated with the one of the first and second linear prediction gains, wherein the determining the difference between one of the first and second linear prediction gains and the long term estimate of the one of the first and second linear prediction gains and/or between the two different long term estimates associated with the one of the first and second linear prediction gains, wherein the determined difference between one of the first and second linear prediction gains and the long term estimate of the one of the first and second linear predictions gains is based on:

$$Gd\_0\_2=\text{abs}(G1\_0\_2-G\_0\_2)$$

where Gd_0_2 comprises the determined difference, G1_0_2 comprises long term estimate of the one of the first and second linear predictions gains, and G_0_2 comprises one of the first and second linear prediction gains; and wherein the determined difference between the two different long term estimates associated with the one of the first and second linear prediction gains is based on:

$$Gd\_2\_16=G1\_2\_16-G2\_2\_16$$

where Gd_2_16 comprises the determined difference, G1_2_16 comprises a first long term estimate, and G2_2_16 comprises a second long term estimate, and (d) low pass filter the first and second linear prediction gains, wherein the low pass filtering of the first and second linear prediction gains is based on:

$$G1\_0\_2=0.85G1\_0\_2+0.15G\_0\_2$$

where G1_0_2 comprises a value from a preceding audio signal segment and G_0_2 comprises a limited first or second linear prediction gain; and determine whether the audio signal segment comprises a pause based on a combined metric obtained from a combination of the first and second linear prediction gains.

3. A method comprising:

computing a first linear prediction gain as a ratio of a residual energy from a first linear prediction and a residual energy from a second linear prediction of a higher order than the first linear prediction for an audio signal segment;

computing a second linear prediction gain calculated as a ratio of the residual energy from the second linear prediction and residual energy from a third linear prediction of a higher order than the second linear prediction for the audio signal segment;

wherein the computing the first linear prediction gain and the computing the second linear prediction gain comprises (a) limiting the first and second linear prediction gains to take on values in a predefined interval, wherein the first and second linear prediction gains take on values between 0 and 8, and wherein the limiting of the first and second linear prediction gains is based on at least one of:

$$G\_0\_2=\max(0,\min(8,E(0)/E(2))),\text{ and}$$

$$G\_2\_16=\max(0,\min(8,E(2)/E(16)))$$

where G_0_2 comprises a limited first or second linear prediction gain, E(0) comprises a residual energy of an input signal, and E(2) comprises a residual energy after a 2nd order linear prediction, where G_2_16 comprises another limited first or second linear prediction gain and E(16) comprises a residual energy after a 16th order linear prediction, (b) creating at least one long term estimate of each of the first and second linear prediction gains, wherein the long term estimate is further created based on earlier first and second linear prediction gains computed for at least one earlier audio signal segment that precedes the audio signal segment, wherein the creating the at least one long term estimate of each of the first and second linear prediction gains is based on:

$$G1\_2\_16EqE=(1-a)G1\_2\_16+a\ G\_2\_16$$

where G1_2_16 comprises a first long term estimate, where G_2_16 comprises a limited first or second linear prediction gain, wherein if G_2_16>G1_2_16, then a=0.2 else a=0.03, (c) determining a difference between one of the first and second linear prediction gains and a long term estimate of the one of the first and second linear prediction gains and/or between two different long term estimates associated with the one of the first and second linear prediction gains, wherein the determining the difference between one of the first and second linear prediction gains and the long term estimate of the one of the first and second linear prediction gains and/or between the two different long term estimates associated with the one of the first and second linear prediction gains, wherein the determined difference between one of the first and second linear prediction gains and the long term estimate of the one of the first and second linear predictions gains is based on:

$$Gd\_0\_2=\mathrm{abs}(G1\_0\_2-G\_0\_2)$$

where Gd_0_2 comprises the determined difference, G1_0_2 comprises long term estimate of the one of the first and second linear predictions gains, and G_0_2 comprises one of the first and second linear prediction gains; and wherein the determined difference between the two different long term estimates associated with the one of the first and second linear prediction gains is based on:

$$Gd\_2\_16=G1\_2\_16-G2\_2\_16$$

where Gd_2_16 comprises the determined difference, G1_2_16 comprises a first long term estimate, and G2_2_16 comprises a second long term estimate, and (d) low pass filtering the first and second linear prediction gains, wherein the low pass filtering of the first and second linear prediction gains is based on:

$$G1\_0\_2=0.85G1\_0\_2+0.15G\_0\_2$$

where G1_0_2 comprises a value from a preceding audio signal segment and G_0_2 comprises a limited first or second linear prediction gain; and determining whether the audio signal segment comprises a pause based on a combined metric obtained from a combination of the first and second linear prediction gains.

4. A method comprising:

computing a first linear prediction gain as a ratio of a residual energy from a first linear prediction and a residual energy from a second linear prediction of a higher order than the first linear prediction for an audio signal segment;

computing a second linear prediction gain calculated as a ratio of the residual energy from the second linear prediction and residual energy from a third linear prediction of a higher order than the second linear prediction for the audio signal segment;

wherein the computing the first linear prediction gain and the computing the second linear prediction gain comprises (a) limiting the first and second linear prediction gains to take on values in a predefined interval, (b) creating at least one long term estimate of each of the first and second linear prediction gains, wherein the long term estimate is further created based on one or more earlier first and second linear prediction gains computed for at least one earlier audio signal segment that precedes the audio signal segment, (c) determining a difference between one of the first and second linear prediction gains and a long term estimate of the one of the first and second linear prediction gains and/or between two different long term estimates associated with the one of the first and second linear prediction gains, and (d) low pass filtering the first and second linear prediction gains; and determining whether the audio signal segment comprises a pause based on a combined metric obtained from a combination of the first and second linear prediction gains.

5. The method of claim 4, wherein:

the first linear prediction is a 0th-order linear prediction;

the second linear prediction is a 2nd-order linear prediction; and the third linear prediction is a 16th order linear prediction.

6. The method of claim 1, wherein filter coefficients of at least one low pass filter that operates to provide the low pass filtering are determined based on a relation between a linear prediction gain associated with the audio signal segment and an average of a corresponding linear prediction gain computed based on a plurality of earlier audio signal segments that precede the audio signal segment.

7. The method of claim 4, wherein the determining of whether the audio signal segment comprises a pause is further based on a measure of spectral closeness associated with the audio signal segment.

8. The method of claim 7, further comprising computing the measure of spectral closeness based on energies for a set of frequency bands of the audio signal segment and background noise estimates corresponding to the set of frequency bands.

9. The method of claim 8, wherein, during an initialization period, an initial value, Emin is used as the background noise estimates based on which the measure of spectral closeness is computed.

10. The method of claim 1, further comprising:

responsive to when the audio signal segment is determined to comprise a pause, updating a background noise estimate based on the audio signal segment to obtain an updated background noise estimate.

11. The method of claim 10, further comprising:

controlling discontinuous transmission of at least one of the audio signal segments from a communication device at least partially based on the updated background noise estimate.

12. The method of claim 3, wherein:

the first linear prediction is a 0th-order linear prediction;

the second linear prediction is a 2nd-order linear prediction; and the third linear prediction is a 16th order linear prediction.

13. The method of claim 4, wherein the first and second linear prediction gains take on values between 0 and 8, and wherein the limiting of the first and second linear prediction gains is based on at least one of:

$$G\_0\_2=\max(0,\min(8,E(0)/E(2))),\ \text{and}$$

$$G\_2\_16=\max(0,\min(8,E(2)/E(16)))$$

where G_0_2 comprises a limited first or second linear prediction gain, E(0) comprises a residual energy of an input signal, and E(2) comprises a residual energy after a 2nd order linear prediction, where G_2_16 comprises another limited first or second linear prediction gain and E(16) comprises a residual energy after a 16th order linear prediction.

14. The method of claim 4, wherein the creating the at least one long term estimate of each of the first and second linear prediction gains is based on:

$$G1\_2\_16EqE=(1-a)\ G1\_2\_16+a\ G\_2\_16$$

where G1_2_16 comprises a first long term estimate, where G_2_16 comprises a limited first or second linear prediction gain, wherein if G_2_16>G1_2_16, then a=0.2 else a=0.03.

15. The method of claim 4, wherein the determining the difference between one of the first and second linear prediction gains and the long term estimate of the one of the first and second linear prediction gains and/or between the two different long term estimates associated with the one of the first and second linear prediction gains, wherein the determined difference between one of the first and second linear prediction gains and the long term estimate of the one of the first and second linear predictions gains is based on:

$$Gd\_0\_2=\text{abs}(G1\_0\_2-G\_0\_2)$$

where Gd_0_2 comprises the determined difference, G1_0_2 comprises long term estimate of the one of the first and second linear predictions gains, and G_0_2 comprises one of the first and second linear prediction gains; and wherein the determined difference between the two different long term estimates associated with the one of the first and second linear prediction gains is based on:

$$Gd\_2\_16=G1\_2\_16-G2\_2\_16$$

where Gd_2_16 comprises the determined difference, G1_2_16 comprises a first long term estimate, and G2_2_16 comprises a second long term estimate.

16. The method of claim 4, wherein the low pass filtering of the first and second linear prediction gains is based on:

$$G1\_0\_2=0.85G1\_0\_2+0.15G\_0\_2$$

where G1_0_2 comprises a value from a preceding audio signal segment and G_0_2 comprises a limited first or second linear prediction gain.

* * * * *